US012695214B2

(12) United States Patent
McGough et al.

(10) Patent No.: US 12,695,214 B2
(45) Date of Patent: Jul. 28, 2026

(54) HORIZONTALLY-POLARIZED OMNIDIRECTIONAL ANTENNA WITH BROADBAND AMPLITUDE TAPER

(71) Applicant: PCTEL, Inc., Bloomingdale, IL (US)

(72) Inventors: Erin Patrick McGough, Seven Hills, OH (US); Susan F. Tedesco, Richfield, OH (US)

(73) Assignee: PCTEL, INC., Bloomingdale, IL (US)

( * ) Notice: Subject to any disclaimer, the term of this patent is extended or adjusted under 35 U.S.C. 154(b) by 23 days.

(21) Appl. No.: 18/762,367

(22) Filed: Jul. 2, 2024

(65) Prior Publication Data

US 2026/0011930 A1 Jan. 8, 2026

(51) Int. Cl.

*H01Q 21/10* (2006.01)
*H01Q 7/00* (2006.01)
*H01Q 21/00* (2006.01)

(52) U.S. Cl.

CPC ............... *H01Q 21/10* (2013.01); *H01Q 7/00* (2013.01); *H01Q 21/0075* (2013.01)

(58) Field of Classification Search

CPC ...... H01Q 21/10; H01Q 7/00; H01Q 21/0075; H01Q 1/42; H01Q 9/285; H01Q 21/0006;

(Continued)

(56) References Cited

U.S. PATENT DOCUMENTS

2006/0082515 A1* 4/2006 Petropoulos ........... H01Q 1/241 343/797
2015/0097748 A1* 4/2015 Hao ......................... H01Q 1/38 343/797

(Continued)

FOREIGN PATENT DOCUMENTS

CN 116646743 B 5/2024
EP 4160823 A1 * 4/2023 ............ H01Q 23/00
JP 6630609 B2 1/2020

OTHER PUBLICATIONS

Wang, H. et al, "A Compact Single Layer Monopulse Microstrip Antenna Array," IEEE Transactions on Antennas and Propagation, vol. 54, No. 2, pp. 503-509, Feb. 2006, doi: 10.1109/TAP.2005.863103.

(Continued)

*Primary Examiner* — Dameon E Levi
*Assistant Examiner* — Jordan E. DeWitt
(74) *Attorney, Agent, or Firm* — Husch Blackwell LLP

(57) ABSTRACT

A horizontally-polarized omnidirectional antenna, including: a body including: a host printed circuit board (PCB) including: a metal-flooded ground plane, windows, and an interconnect providing a radio frequency (RF) signal splitting off into $2*Z_0$ transmission lines, a plurality of antenna elements, corresponding to respective windows, including: an antenna PCB including an antenna slot having a pullback region with the host PCB therein without directly contacting the pullback region, the window in the antenna slot, loops of conducting strips at top and bottom sides of the antenna PCB, slightly overlapping to form capacitive elements at overlap regions, a pair of input solder joints at respective input conducting strips on the top of the antenna PCB, on opposite sides of the window, a transmission feed solder joint directly between the pair of input solder joints across the window, connected to a $Z_0$ feed line, and an RF connector receiving an antenna power supply.

8 Claims, 28 Drawing Sheets

(58) Field of Classification Search

CPC ......... H01Q 21/08; H05K 2201/10098; H05K 1/0243; H05K 1/0298; H05K 1/16; H05K 1/181; H05K 1/115; H05K 1/165; H05K 1/0218; H05K 1/141; H05K 1/186; H05K 2201/0723; H05K 1/0251; H05K 1/189; H05K 2201/09618; H05K 1/18; H05K 2201/10734; H05K 1/0215; H05K 1/0248; H05K 2201/09727; H05K 2201/10015; H05K 2201/10189; H05K 2201/10522; H05K 2201/10545; H05K 1/0216; H05K 1/0237; H05K 1/025; H05K 1/183; H05K 3/368; H05K 3/4611; H05K 1/0219; H05K 1/0225; H05K 1/0228; H05K 1/024; H05K 1/0277; H05K 1/116; H05K 1/117; H05K 1/148; H05K 1/162; H05K 2201/041; H05K 2201/042; H05K 2201/0715; H05K 2201/09163; H05K 2201/09181; H05K 2201/092; H05K 2201/09254; H05K 2201/093; H05K 2201/09563; H05K 2201/096; H05K 2201/0969; H05K 2201/10356; H05K 3/30; H05K 3/34; H05K 3/3405; H05K 3/3447; H05K 3/4038; H05K 3/4623; H05K 7/1425; H05K 7/1427; H05K 1/0203; H05K 1/0224; H05K 1/023; H05K 1/0295; H05K 1/14; H05K 1/142; H05K 1/147; H05K 2201/056; H05K 2201/09027; H05K 2201/09663

USPC ..................................... 455/575.7, 90.2, 561

See application file for complete search history.

(56) References Cited

U.S. PATENT DOCUMENTS

| | | | | |
|---|---|---|---|---|
| 2015/0280324 | A1 | 10/2015 | Petropoulos | |
| 2016/0174364 | A1* | 6/2016 | Harkness, Jr. | H05K 1/115<br>174/262 |
| 2019/0103675 | A1* | 4/2019 | McGough | H01Q 9/04 |
| 2022/0115774 | A1* | 4/2022 | Potens | H01Q 5/342 |
| 2023/0106893 | A1* | 4/2023 | Saveri | H01Q 21/10<br>343/702 |
| 2024/0039163 | A1 | 2/2024 | Zhang et al. | |
| 2026/0011930 | A1* | 1/2026 | McGough | H01Q 21/10 |
| 2026/0011931 | A1* | 1/2026 | McGough | H01Q 21/29 |

OTHER PUBLICATIONS

Huang, G.L. et al., "A Low Profile and Low Sidelobe Wideband Slot Antenna Array Feb by an Amplitude-Tapering Waveguide Feed-Network," IEEE Transactions on Antennas and Propagation, vol. 63, No. 1, pp. 419-423, Jan. 2015, doi: 10.1109/TAP.2014.2365238.

Xu, J. et al., "A Wideband Horizontal Polarized Omnidirectional Loop Antenna," 2018 IEEE International Symposium on Antennas and Propagation & USNC/URSI National Radio Science Meeting, Jul. 1, 2018, pp. 657-658. doi: 10.1109/APUSNCURSINRSM.2018.8608585.

Ye, H.L. et al., "Broadband Horizontally Polarized Omnidirectional Antenna Array for Base-Station Applications," IEEE Transactions on Antennas and Propagation, vol. 67, No. 4, Apr. 2019, pp. 292-297, doi: 10.1109/TAP.2019.2894030.

Singh, B. "Compact Planar Antenna Array With Tapering in Both Planes for Desired First Sidelobe Reduction," IEEE Antennas and Wireless Propagation Letters, vol. 18, No. 3, pp. 531-535, Mar. 2019, doi: 10.1109/LAWP.2019.2896114.

Wei, K. et al., "Design of a Wideband Horizontally Polarized Omnidirectional Printed Loop Antenna," IEEE Antennas and Wireless Propagation Letters, vol. 11, 2012, pp. 49-52, doi:10.1109/LAWP.2012.2182670.

Li, M. et al., "Electrically Small Loop Antenna with Horizontally Omnidirectional Radiation Pattern," 2023 IEEE International Symposium on Antennas and Propagation & USNC/URSI National Radio Science Meeting, Jul. 23-28, 2023, pp. 909-910, doi: 10.1109/USNC-URSI52151.2023.10237788.

Qing, X. et al., "Metamaterial-based Wideband Horizontally Polarized Omnidirectional 5-GHz WLAN Antenna Array," The 8th European Conference on Antennas and Propagation (EuCAP 2014), The Hague, Netherlands, 2014, pp. 605-608, doi: 10.1109/EuCAP.2014.6901831.

Quan, X. et al., "Novel Broadband Omnidirectional Antennas," Proceedings of APMC 2012, Kaohsiung, Taiwan, Dec. 4-7, 2012, pp. 1334-1336, doi: 10.1109/APMC.2012.6421911.

Extended European Search Report re application No. EP 25186899.8, dated Mar. 6, 2026.

* cited by examiner

HORIZONTALLY-POLARIZED OMNIDIRECTIONAL ANTENNA WITH BROADBAND AMPLITUDE TAPER

TECHNICAL FIELD

This disclosure generally relates to an antenna. More particularly, this disclosure relates to a horizontally-polarized omnidirectional antenna with broadband amplitude taper, and even more particularly, a horizontally-polarized omnidirectional antenna with broadband amplitude taper for applications requiring high sidelobe suppression.

BACKGROUND

In the information age, broadband spectrum radio frequency (RF) transmission is increasingly important. However, power levels output by antennas at various radio bands can interfere with government-regulated parts of the radio frequency spectrum. In the United States, to protect incumbent services that operate in the 6 GHz band from interference, the Federal Communications Commission (FCC) has mandated that all standard power access points operating outdoors over Unlicensed National Information Infrastructure (U-NII) band 5 (U-NII-5) at 5.925-6.425 GHz and band 7 (U-NII-7) at 6.525-6.875 must not exceed 21 dBm effective isotropic radiated power (EIRP), which is the realized gain of the antenna (dBi) plus the power (dBm) supplied to the antenna, at all points in space that are greater than or equal to 30° above the horizon. This imposes a constraint on the antenna design; specifically, that the skyward radiation level must be low enough so that, in combination with the conducted output power and correlated gain, the EIRP limit is satisfied. Conventional solutions do not adequately suppress the radiation in both ≥30° skyward regions to at most −15 dB below the peak gain of the antenna. Also, conventional solutions are oftentimes not omnidirectional in the azimuth plane of the antenna and do not have sufficient operational bandwidth and are, therefore, not "broadband" antennas.

Thus, there is a need for a horizontally-polarized omnidirectional antenna with broadband amplitude taper for applications requiring high sidelobe suppression.

BRIEF SUMMARY

As described above, conventional antennas do not adequately suppress the radiation in both ≥30° skyward regions to at most −15 dB below the peak gain of the antenna. Also, conventional antennas are oftentimes not omnidirectional in the azimuth plane of the antenna and do not have sufficient operational bandwidth and are, therefore, not "broadband" antennas.

This disclosure pertains to a horizontally-polarized omnidirectional antenna with broadband amplitude taper. An advantage of the horizontally-polarized omnidirectional antenna with broadband amplitude taper is that is provides high sidelobe suppression and thereby improves system-level performance by permitting maximum EIRP transmissions, resulting in increased range and data rates. The transmit power of radio systems that do not comply with the ≥30° EIRP regulation must by reduced until the 21 dBm EIRP limit is satisfied.

A first aspect of this disclosure pertains to a horizontally-polarized omnidirectional antenna, including: a body including: a host printed circuit board (PCB) including: a plurality of host slots, a metal-flooded ground plane, a plurality of windows in the metal-flooded ground plane, respectively corresponding to the plurality of host slots, an interconnect configured to convey a radio frequency (RF) signal at characteristic impedance $Z_0$, and a common port configured to receive the RF signal and split off into first and second $2{*}Z_0$ transmission lines to form an equal power division at a first power split, each of the first and second $2{*}Z_0$ transmission lines being configured to step into $Z_0^{1/2}$ at a second power split using a multi-section transformer including a $0.5\sqrt{(2)}{*}Z_{high}$ line and a first $Z_0$ line, the first $Z_0$ line dividing power at the second power split to form a $Z_{high}$ line and a second $Z_0$ line at a chamfer, the $Z_{high}$ line extending from an antenna taper location that is more than halfway down the chamfer from the second power split, the $Z_{high}$ line stepping into a third $Z_0$ line using a $2{*}Z_0$ transformer, where $Z_{high}$ is at least $2.25{*}Z_0$, a plurality of antenna elements, each corresponding to a respective one of the plurality of host slots and a respective window corresponding to the respective host slot of the host PCB, each of the plurality of antenna elements including: an antenna PCB, the antenna PCB including an antenna slot having a pullback region such that the host PCB is inserted into the antenna PCB in the antenna slot, the antenna PCB is inserted into the host PCB in the corresponding host slot, the corresponding window is in the antenna slot, and the pullback region being spaced apart from the host PCB, a first plurality of conducting strips at an outer periphery of a top side of the antenna PCB in a loop pattern, a second plurality of conducting strips at an outer periphery of a bottom side of the antenna PCB in a loop pattern, such that ends of each of the second plurality of conducting strips slightly overlap ends of each of the first plurality of conducting strips to form a plurality of capacitive elements at overlap regions, a pair of input conducting strips respectively connected to an opposing pair of the first plurality of conducting strips on the top side of the antenna PCB, a first shunt stub crossing the pair of input conducting strips on the top side of the antenna PCB, a pair of input connection solder joints at respective ends of the pair of input conducting strips near a center of the antenna PCB on the top side of the antenna PCB, the input connection solder joints being on opposite sides of the corresponding window of the host PCB, a first compensation strip extending from one of the first plurality of conducting strips adjacent to pullback region of the antenna slot on the top side of the antenna PCB, a transmission feed connection solder joint connected directly between the pair of input connection solder joints across the respective window, a pair of ground conducting strips respectively connected to an opposing pair of the second plurality of conducting strips on the bottom side of the antenna PCB, a second shunt stub crossing the pair of input conducting strips on the bottom side of the antenna PCB, a pair of ground connection solder joints at respective ends of the pair of ground conducting strips near a center of the antenna PCB on the bottom side of the antenna PCB, the ground connection solder joints being on opposite sides of the corresponding window of the host PCB, a ground return connection solder joint connected directly between the pair of ground connection solder joints across the respective window, and a second compensation strip extending from one of the second plurality of conducting strips adjacent to the antenna slot opposite to the pullback region of the antenna slot on the bottom side of the antenna PCB, and an RF connector coupled to one end of the body to receive a power supply for the antenna, wherein each of the second and third $Z_0$ lines of each of the first and second $2*Z_0$ transmission lines is connected to a corresponding transmission feed connection solder joint of a corresponding antenna element.

A second aspect of this disclosure pertains to the antenna of the first aspect, wherein each antenna element includes a loop antenna.

A third aspect of this disclosure pertains to the antenna of the first aspect, wherein: the host PCB further includes a plurality of openings in the metal-flooded ground plane, the plurality of openings respectively corresponding to one of the plurality of antenna elements, and each of the plurality of antenna elements further includes: a first pair of mechanical solder joints on the top side of the antenna PCB, the first pair of mechanical solder joints being located on opposite sides of the corresponding opening in the host PCB to mechanically fix the top side of the antenna PCB to the host PCB, and a second pair of mechanical solder joints on the bottom side of the antenna PCB, the second pair of mechanical solder joints being located on opposite sides of the corresponding opening in the host PCB to mechanically fix the bottom side of the antenna PCB to the host PCB.

A fourth aspect of this disclosure pertains to the antenna of the third aspect, wherein: the first pair of mechanical solder joints is physically connected to each other, the second pair of mechanical solder joints is physically connected to each other, and the first pair of mechanical solder joints is physically connected to the second pair of mechanical solder joints.

A fifth aspect of this disclosure pertains to the antenna of the first aspect, wherein each $Z_{high}$ line includes: an 8 mil-wide trace, and a gap-to-ground distance of 16 mils.

A sixth aspect of this disclosure pertains to the antenna of the first aspect, wherein the metal-flooded ground plane of the host PCB reflects energy radiated by each antenna element.

A seventh aspect of this disclosure pertains to the antenna of the first aspect, wherein the metal-flooded ground plane includes copper.

An eighth aspect of this disclosure pertains to the antenna of the first aspect, wherein the antenna is configured to operate in a band of about 4.9-6.9 GHz.

A ninth aspect of this disclosure pertains to a method, including: energizing a horizontally-polarized antenna fed by a coaxial cable that is driven by a radio frequency (RF) signal, transmitting the RF signal via a $Z_0$ interconnector line to a common port, splitting off the $Z_0$ interconnector line into first and second $2*Z_0$ transmission lines to form an equal power division at a first power split, stepping each of the first and second $2*Z_0$ transmission lines into $Z_0^{1/2}$ at a second power split using a multi-section transformer including a $0.5\sqrt{(2)}*Z_{high}$ line and a first $Z_0$ line, dividing power at the second power split via the first $Z_0$ line to form a $Z_{high}$ line and a second $Z_0$ line at a chamfer, the $Z_{high}$ line extending from an antenna taper location that is more than halfway down the chamfer from the second power split, stepping the $Z_{high}$ line into a third $Z_0$ line using a $2*Z_0$ transformer, feeding a signal on each of the second and third $Z_0$ lines of each of the first and second $2*Z_0$ transmission lines to a corresponding transmission feed connection solder joints of a corresponding antenna element among a plurality of loop antenna elements, and generating, by the plurality of loop antenna elements, an omnidirectional RF radiation pattern having less than or equal to 21 dBm effective isotropic radiative power (EIRP) at all points in space that are greater than or equal to 30° above a horizon.

A tenth aspect of this disclosure pertains to the method of the ninth aspect, wherein the metal-flooded ground plane of the host PCB reflects energy radiated by each antenna element.

An eleventh aspect of this disclosure pertains to the method of the ninth aspect, wherein the antenna is configured to operate in a band of about 4.9-6.9 GHz.

A twelfth aspect of this disclosure pertains to the method of the eleventh aspect, wherein the RF radiation pattern suppresses radiation in both ≥30° skyward regions to ≤−15 dB below the peak gain of the antenna.

A thirteenth aspect of this disclosure pertains to the method of the eleventh aspect, wherein the RF output is a broadband output having at least 33% impedance bandwidth.

A fourteenth aspect of this disclosure pertains to the method of the eleventh aspect, wherein the RF radiation pattern is in a bandwidth including Unlicensed National Information Infrastructure (U-NII) band 5 (U NII-5) at 5.925-6.425 GHz and band 7 (U NII-7) at 6.525-6.875.

A fifteenth aspect of this disclosure pertains to a method of manufacturing a horizontally-polarized omnidirectional antenna, the method including: providing a body including: providing a host printed circuit board (PCB) including: providing a plurality of host slots, providing a metal-flooded ground plane, providing a plurality of windows in the metal-flooded ground plane, respectively corresponding to the plurality of host slots, and providing an interconnect configured to provide a $Z_0$ radio frequency (RF) signal, providing a common port configured to receive the $Z_0$ RF signal and split off into first and second $2*Z_0$ transmission lines to form an equal power division at a first power split, each of the first and second $2*Z_0$ transmission lines being configured to step into Zoa at a second power split using a multi-section transformer including a $0.5\sqrt{(2)}*Z_{high}$ line and a first $Z_0$ line, the first $Z_0$ line dividing power at the second power split to form a $Z_{high}$ line and a second $Z_0$ line at a chamfer, the $Z_{high}$ line extending from an antenna taper location that is more than halfway down the chamfer from the second power split, the $Z_{high}$ line stepping into a third $Z_0$ line using a $2*Z_0$ transformer, providing a plurality of antenna elements, each corresponding to a respective one of the plurality of host slots and a respective window corresponding to the respective host slot of the host PCB, each of the plurality of antenna elements including: providing an antenna PCB, the antenna PCB including an antenna slot having a pullback region such that the host PCB is inserted into the antenna PCB in the antenna slot, the antenna PCB is inserted into the host PCB in the corresponding host slot, the corresponding window is in the antenna slot, and the pullback region being spaced apart from the host PCB, providing a first plurality of conducting strips at an outer periphery of a top side of the antenna PCB in a loop pattern, providing a second plurality of conducting strips at an outer periphery of a bottom side of the antenna PCB in a loop pattern, such that ends of each of the second plurality of conducting strips slightly overlap ends of each of the first plurality of conducting strips to form a plurality of capacitive elements at overlap regions, providing a pair of input conducting strips respectively connected to an opposing pair of the first plurality of conducting strips on the top side of the antenna PCB, providing a first shunt stub crossing the pair of input conducting strips on the top side of the antenna PCB, providing a pair of input connection solder joints at respective ends of the pair of input conducting strips near a center of the antenna PCB on the top side of the antenna PCB, the input connection solder joints being on opposite sides of the corresponding window of the host PCB, providing a first compensation strip extending from one of the first plurality of conducting strips adjacent to pullback region of the antenna slot on the top side of the antenna PCB, providing a transmission feed connection solder joint connected directly between the pair of input connection solder joints across the respective window, and providing a second compensation strip extending from one of the second plurality of conducting strips adjacent to the antenna slot opposite to the pullback region of the antenna slot on the bottom side of the antenna PCB, and providing an RF connector coupled to one end of the body to receive a power supply for the antenna, wherein each of the second and third $Z_0$ lines of each of the first and second $2*Z_0$ transmission lines is connected to a corresponding transmission feed connection solder joints of a corresponding antenna element.

A sixteenth aspect of this disclosure pertains to the method of the fifteenth aspect, wherein the providing each antenna element includes providing a loop antenna.

A seventeenth aspect of this disclosure pertains to the method of the fifteenth aspect, wherein: the providing the host PCB further includes providing a plurality of openings in the metal-flooded ground plane, the plurality of openings respectively corresponding to one of the plurality of antenna elements, and the providing each of the plurality of antenna elements further includes: providing a first pair of mechanical solder joints on the top side of the antenna PCB, the first pair of mechanical solder joints being located on opposite sides of the corresponding opening in the host PCB to mechanically fix the top side of the antenna PCB to the host PCB, and providing a second pair of mechanical solder joints on the bottom side of the antenna PCB, the second pair of mechanical solder joints being located on opposite sides of the corresponding opening in the host PCB to mechanically fix the bottom side of the antenna PCB to the host PCB.

An eighteenth aspect of this disclosure pertains to the method of the seventeenth aspect, wherein: the first pair of mechanical solder joints is physically connected to each other, the second pair of mechanical solder joints is physically connected to each other, and the first pair of mechanical solder joints is physically connected to the second pair of mechanical solder joints.

A nineteenth aspect of this disclosure pertains to the method of the fifteenth aspect, wherein each $Z_{high}$ line includes: an 8 mil-wide trace, and a gap-to-ground distance of 16 mils.

A twentieth aspect of this disclosure pertains to the method of the fifteenth aspect, wherein the metal-flooded ground plane includes copper.

Figure 1:
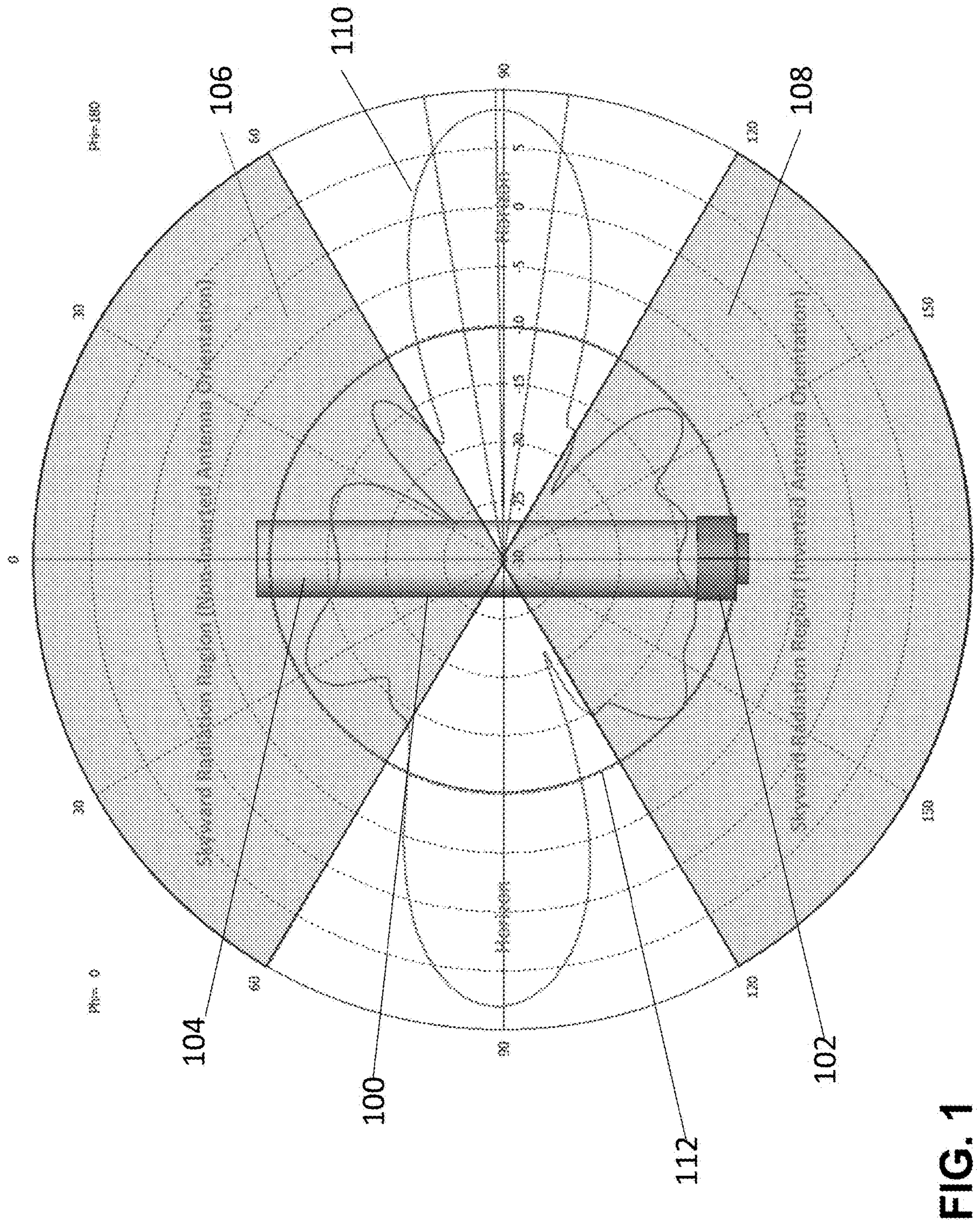
FIG. 1 illustrates a chart of a radiation pattern of an antenna according to an embodiment.

Before explaining the disclosed embodiments of this disclosure in detail, it is to be understood that the invention is not limited in its application to the details of the particular arrangement shown, as the invention is capable of other embodiments. Example embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION

While subject disclosure is susceptible of embodiments in many different forms, there are shown in the drawings and will be described in detail herein specific embodiments with the understanding that the present disclosure is an exemplification of the principles of the invention. It is not intended to limit the invention to the specific illustrated embodiments. The features of the invention disclosed herein in the description, drawings, and claims can be significant, both individually and in any desired combinations, for the operation of the invention in its various embodiments. Features from one embodiment can be used in other embodiments of the invention.

FIG. 1 illustrates a radiation pattern of an antenna in the ≥30° skyward regions.

An antenna 100 may be provided in a non-inverted orientation or in an inverted orientation. The antenna 100 illustrated in FIG. 1 is shown in a non-inverted orientation, and includes a connector 102 at one end that is illustrated as pointing down from a horizontal plane, e.g., directed toward the ground, with a body 104 of the antenna 100 that is illustrated as being pointed skyward. There are two ways an antenna 100 can be mounted, e.g., to achieve omnidirectional coverage in the plane around the antenna: (1) right-side-up or (2) inverted. The regions restricted by the FCC are shown in the shaded regions 106 and 108 of FIG. 1. Embodiments may suppress radiation directed to both regions. The curve 110 of FIG. 1 shows a radiation pattern for an antenna 100 according to an embodiment in which the gain near the horizon (90°) is high, increased, or maximized, while skyward radiation at 0° or 180° (depending on non-inverted or inverted orientations) has a gain at or below −10 dBi, shown by line 112. It should be noted that FIG. 1 illustrates a single elevation plane slice; the antenna 100 (or antennas) and radio transmitter should satisfy the EIRP limit for all elevation plane cuts.

While the antenna 100 may cover the U-NII-5 band and the U-NII-7 band as described above, an operational bandwidth of the antenna 100 may also cover the 4.9 GHz public safety band and/or the 5 GHz U-NII-1 band at 5.150-5.250 GHz, which also must satisfy the FCC's 21 dBm EIRP requirement, without increasing the size of the antenna 100. Therefore, potentially, one antenna may cover the 5 GHz and 6 GHz bands. It is also possible to reduce the frequency range of the antenna 100 to cover only 5 GHz or 6 GHz bands. In embodiments, the coverage of the antenna 100 may be for example, 4.9-6.9 GHz, or for example, 5.15-5.875 GHz and/or 5.925-6.875 GHz.

The antenna 100 is a horizontally-polarized, omnidirectional antenna that utilizes a broadband, tapered amplitude distribution to limit the radiation in unwanted directions to, for example, at most −15 dB below the peak gain of the antenna. The antenna 100 may also have at least, for example, 6 dBi of realized gain, good efficiency (e.g., >75%), and highly omnidirectional radiation patterns (e.g., less than 3 dB of ripple in the azimuth plane). It is desirable that these specifications be met over the full operational bandwidth.

FIGS. 2-8 show various views of the configuration of the antenna 100 according to an embodiment. The antenna 100 according to an embodiment may include the connector 102 of FIG. 1, and, as the body 104 of FIG. 1, the antenna 100 may further include a radome 202, four antenna elements 302, 304, 306, and 308, a host printed circuit board (PCB) 310, and an interconnect 312.

Figure 2:
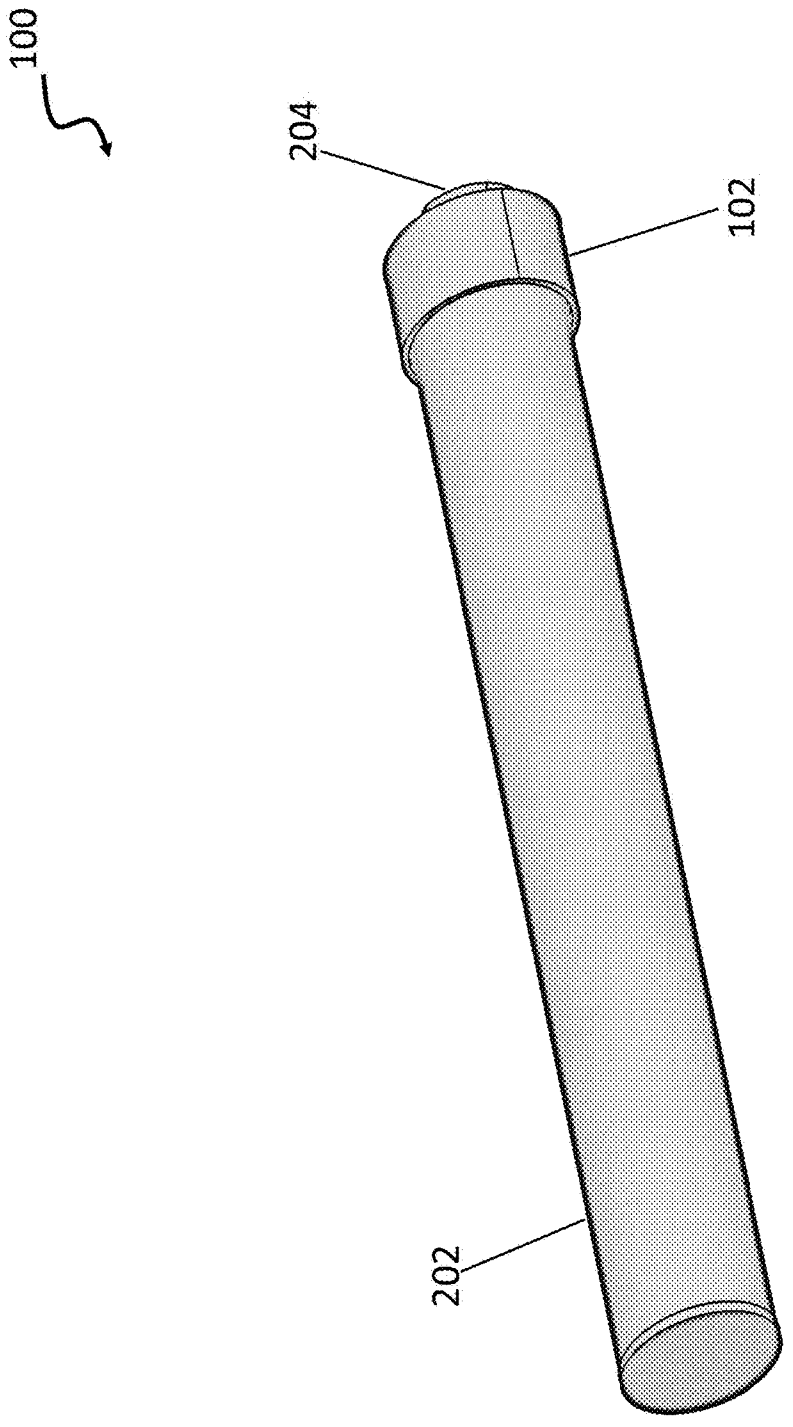
FIG. 2 is a perspective view of an antenna according to an embodiment.

FIG. 2 illustrates an outside view of the antenna 100. The antenna 100 includes the connector 102 at one end and the radome 202 on the outside of the body 104 (see FIG. 1). The connector 102 includes a port 204 for guiding RF power to and from a radio transceiver (not shown). In one example, the radome 102 may have a diameter of one inch, and the antenna 100 may have a total length of about 7.3 inches, although embodiments are not limited thereto. The connector may be, for example, a coaxial connector, which may be an N-type, e.g., N-male or N-female. The radome may be made of any suitable material, for example, a polycarbonate and/or an acrylonitrile butadiene styrene (ABS) blend, that has a low enough index of refraction to be nearly transparent to enable electromagnetic transmission and reception over C band or any other desirable band. The copper features for producing the desired radiation pattern are housed inside the radome 202, as described below.

Figure 3:
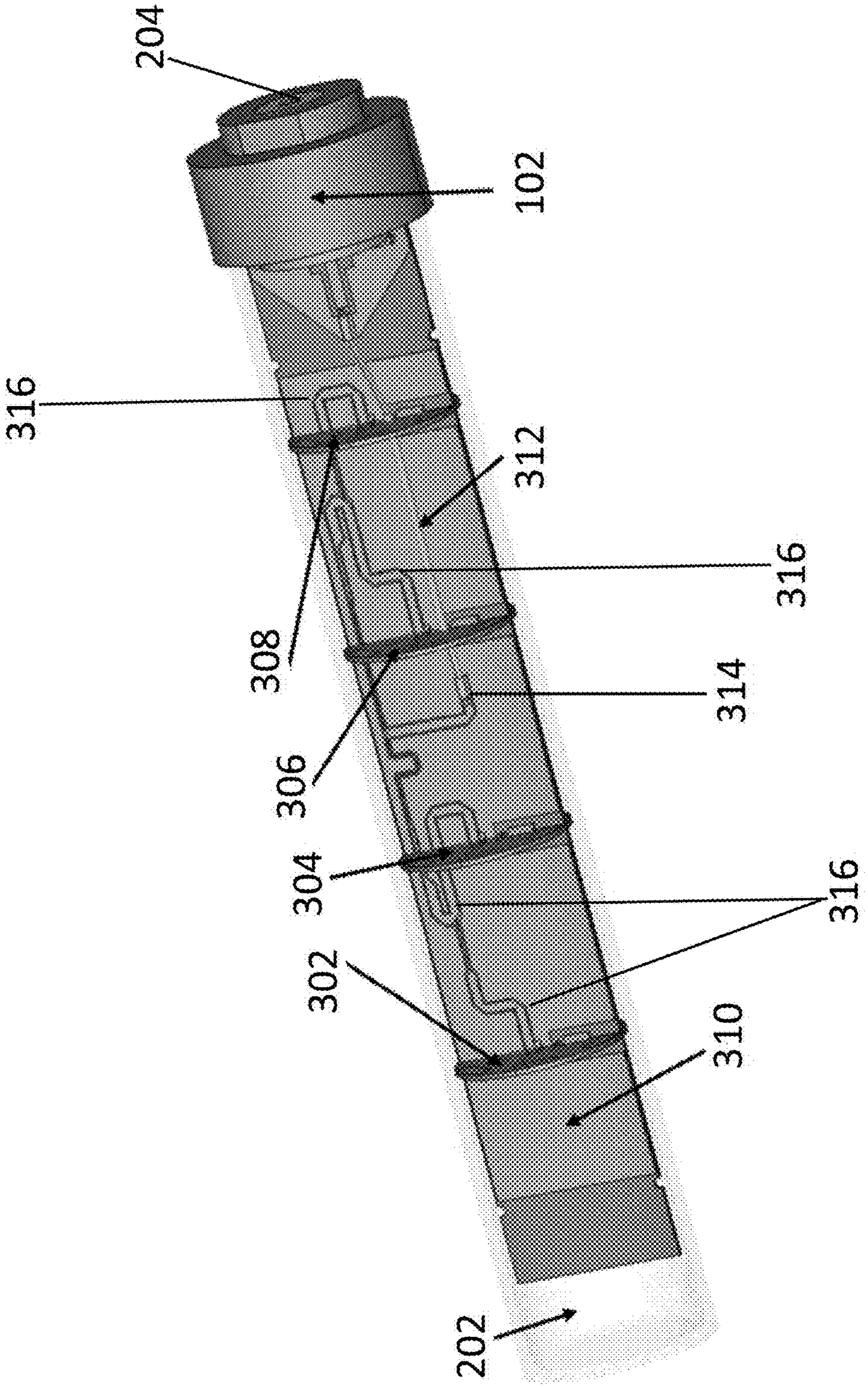
FIG. 3 is a perspective view of a model of an antenna according to an embodiment.
Figure 4:
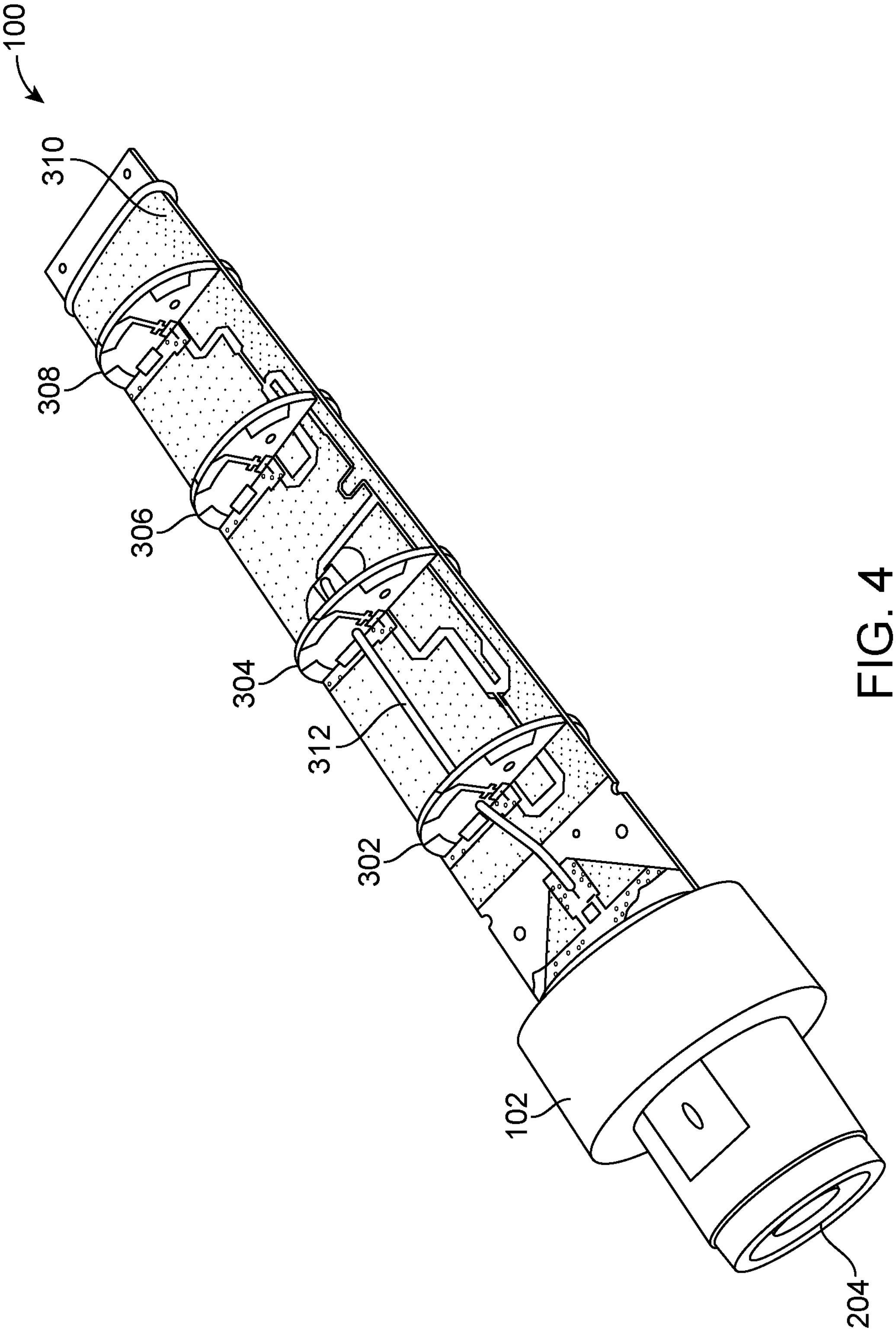
FIG. 4 is a photograph of a prototype antenna configured according to an embodiment.

FIG. 3 illustrates an internal view of the antenna 100 with the outer radome 202 shown as being transparent for convenience of illustration of internal features. FIG. 4 is a photograph of a prototype of the antenna 100 without the radome 202 for convenience of illustration of internal features. The antenna 100 includes the four antenna elements 302, 304, 306, and 308, a host printed circuit board (PCB) 310, and an interconnect 312. The interconnect 312 may be, for example, a jumper cable. The jumper cable may be stripped and soldered to the host PCB or it may be connectorized. The interconnect 312 may be used to route radio frequency (RF) signal energy between the connector 102 and a common port 314 of a feed network 316.

Figure 5:
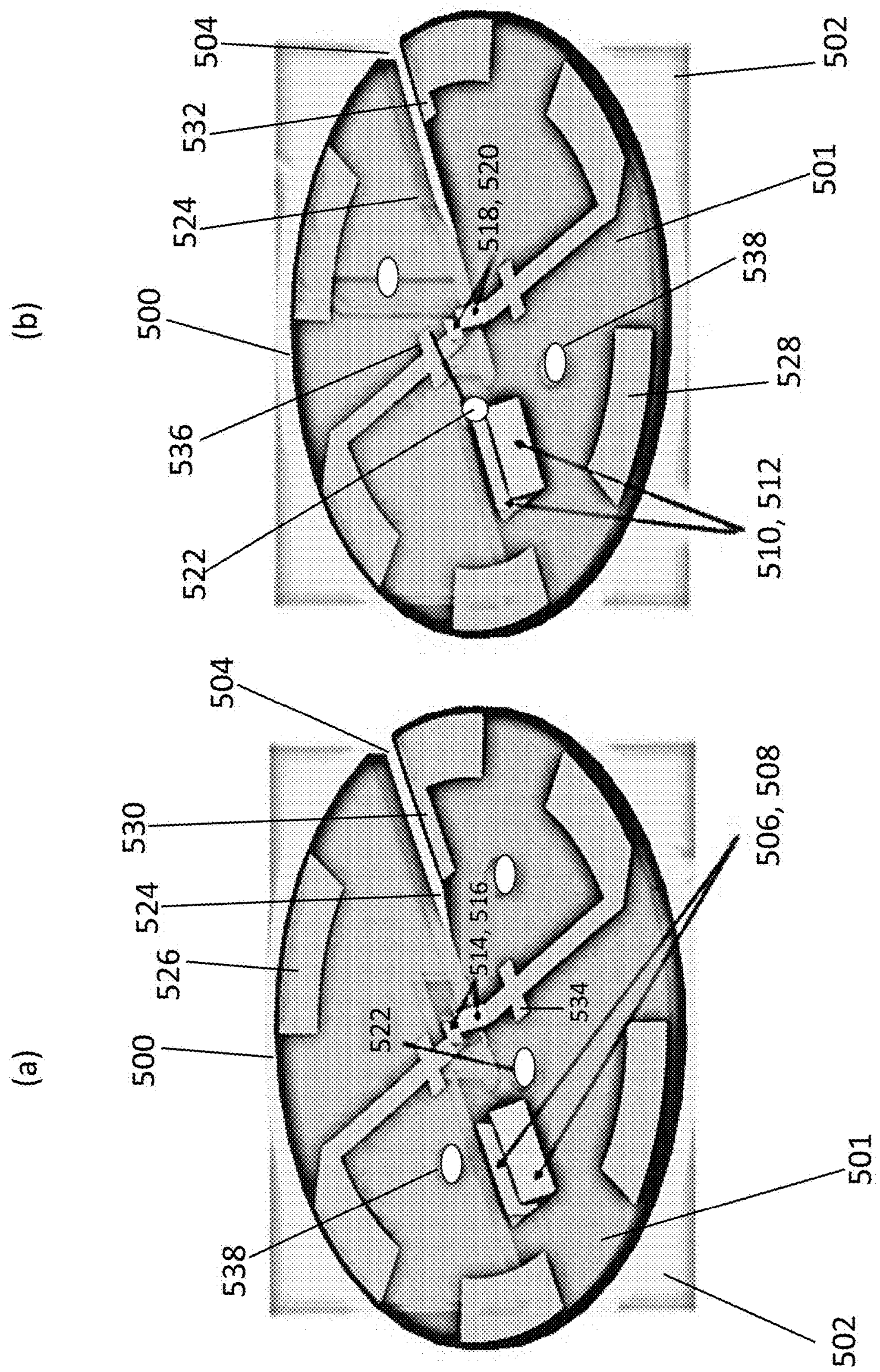
FIG. 5 is a perspective view of an antenna element according to an embodiment.

FIG. 5 illustrates an example antenna element 500. The antenna element 500 may be a circular antenna, and may be used for any of the antenna elements 302, 304, 306, 308 of FIG. 3. FIG. 5, part (a) shows a top side of the antenna element 500. FIG. 5, part (b) shows a bottom side of the antenna element 500. The antenna element 500 includes an antenna PCB 501 that may be mounted onto a host PCB 502 via a slot 504. The host PCB 502 may be the host PCB of FIG. 3. In the antenna 100 shown in FIG. 3, the antenna elements 302, 304, 306, 308 are illustrated as being oriented with the top side of each facing away from the connector 102.

The antenna element 500 may be soldered to the host PCB 502, which may be soldered to a connector, e.g., connector 102 of FIG. 2. The connection locations on the element are detailed in FIG. 5, which illustrates four, sizable mechanical solder joints 506, 508, 510, 512 on the top and bottom sides of the element 500, with two mechanical solder locations 506, 508 on the top side of the antenna element 500, as illustrated in FIG. 5, part (a), and two mechanical solder locations 510, 512 on the bottom side of the antenna element 500, as illustrated in FIG. 5, part (b). The mechanical solder joints 506, 508, 510, 512 may be formed by two pads on the antenna PCB 501 and two pads on the host PCB 502. The mechanical solder joints 506, 508, 510, 512 may be provided as fillet tabs, although embodiments are not limited thereto. Each pair of opposite-side pads 506, 510 and 508, 512 may be tied together with vias through the antenna PCB 501, and each pair of same-side pads 506, 508 and 510, 512 may be tied together with vias through the host PCB 502 to form a single solid metallic block when solder is applied. The mechanical solder joints 506, 508, 510, 512 may be used for convenience of assembly of the antenna 100, and may be alternatively provided as any stabilizing structure in the described locations to form mechanical stabilizers, and are not limited to the described solder, metal, or fillet tabs.

The antenna element 500 has four electrical connection locations 514, 516, 518, 520, e.g., two electrical connection locations 514, 516 for an RF signal on the top side, as illustrated in FIG. 5, part (a), and two electrical connection locations 518, 520 for an RF ground on the bottom side, as illustrated in FIG. 5, part (b). The electrical connection locations 514, 516, 518, 520 may be referred to as a "feed point." An interconnect clearance hole 522 may be provided through the antenna PCB 501, e.g., for the jumper cable of FIG. 3 to pass through the antenna element 500 to reach the common port 314 of the feed network 316, for example, if the antenna element 500 is mounted on the host PCB 310 downstream of (or below) the common port 314. In one example, the electrical connection locations 514, 516, 518, 520 may be provided as solder joints. In an embodiment, the electrical connection locations 514, 516, 518, 520 are provided as solder joints, and may have a same or similar shape as fillet tabs.

In one example, the host PCB 502 may not be flooded with ground, and the feed network 316 may include microstrip transmission lines. However, has been observed that routing the microstrip lines close to the antenna 100 perturbed the surface current distribution of the antenna element 500. Therefore, in another embodiment, a pullback 524 may be provided on the antenna PCB 501 on the side of the feed network 316 transmission lines of the host PCB 502. When the feed network 316 of the host PCB 310 is coplanar waveguide with ground (CPWG) and the host PCB 310 is flooded, high decoupling between the antenna element 500 and the host PCB feed network 316 transmission lines may be achieved. A plurality of conducting strips 526, 528, e.g., of copper, may be formed, e.g., printed, around the outer periphery on the top and bottom sides of the antenna PCB 501 in loop patterns, e.g., as circles, and may slightly overlap to form capacitors. Each antenna PCB 501 may be formed as a circular disc, as illustrated in FIG. 5, which may facilitate formation of the loop. A periodic phase lead (e.g., capacitor) may be distributed around the loop to form a near-constant phase distribution. The power may split once, close to the entry location of the power near the center of the antenna PCB 501.

Some length (e.g., parallel to the slot) may be added to the strips 530, 532 adjacent to the pullback 524 to compensate for the change to the input impedance and radiation patterns because these strips may be shortened by slotting the PCB. A first strip compensation 530 is shown in FIG. 5, part (a), and a second strip compensation 532 is shown in FIG. 5, part (b). The respective lengths of the strip compensations 530, 532 and the location and length of shunt stubs 534, 536 (e.g., stub matches) that may be placed near the feed point to achieve low azimuth plane ripple and excellent return loss. A shunt stub may imply a conductor, e.g., copper, on the top and bottom of the PCB. The antenna 100 may have a $Z_0$ input impedance, e.g., 50Ω. One or more optional mount holes 538 may be provided through the antenna PCB 501, e.g., for tooling purposes or for the routing of other cables through the array.

Figure 6:
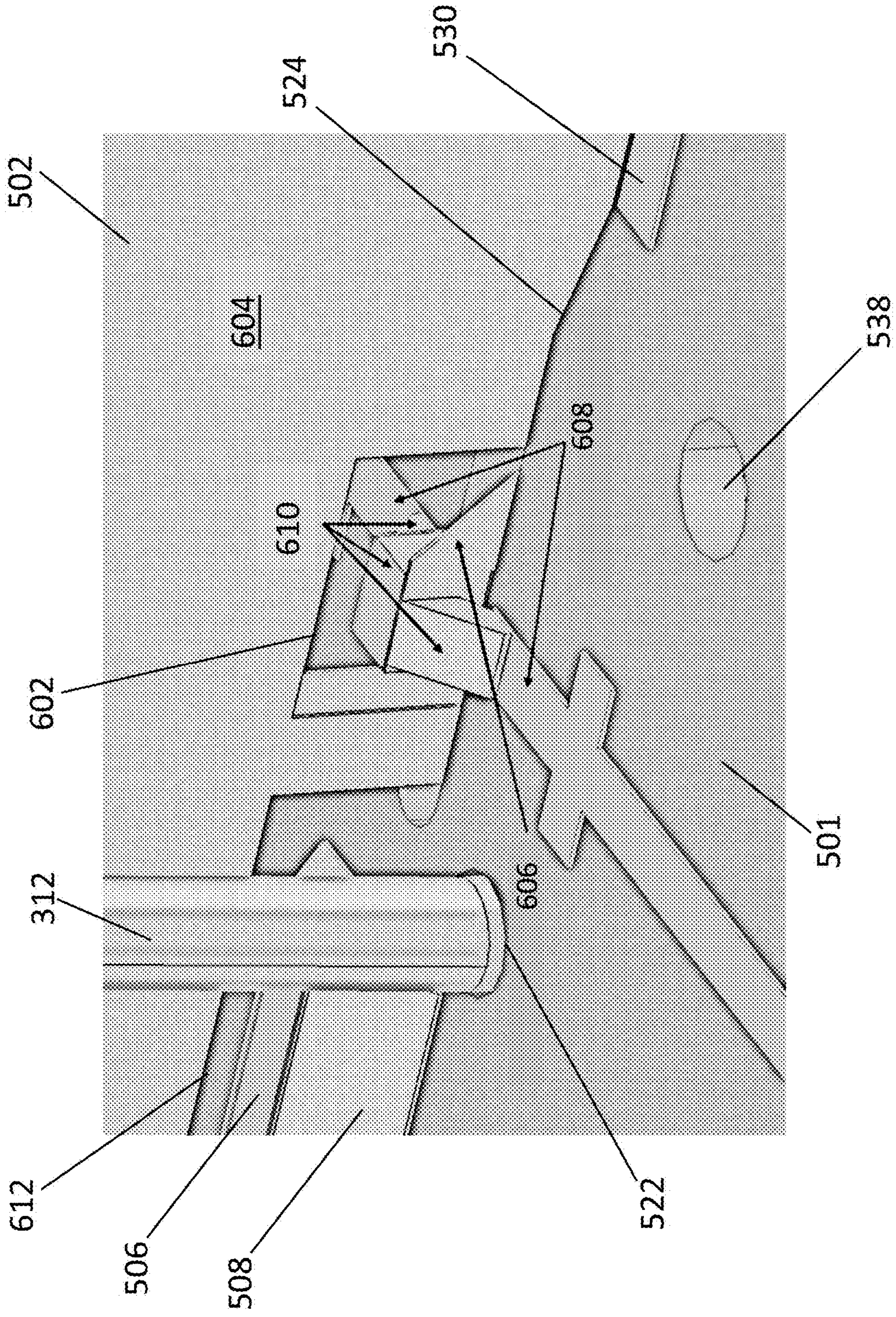
FIG. 6 shows an expanded view of a center region of a top side of the antenna element of FIG. 5.

FIG. 6 shows an expanded view of the center region of the top side of the antenna element 500 as shown in FIG. 5, part (a). The configuration of the RF transition from the host PCB to the antenna PCB provides impedance control and preserves pattern quality. The transition is depicted in FIG. 6. A window 602 is created in a ground flood 604 of the host PCB 502 to allow a $Z_0$, e.g., 50Ω, RF signal line 606 that routes up the host PCB 502 to split into two $2*Z_0$, e.g., 100Ω, paired-strip transmission lines 608, e.g., input conducting strips, on the antenna PCB 501. Impedance control is achieved by shaping a solder pad 610 and the surrounding window 602, and it may be a broadband transition. The solder pad 610 may be plated-through to drive both sides of the antenna element 500. The solder pad 610 may include the solder joints 514, 516 shown in FIG. 5, part (a), which may be provided as connection fillet tabs. Respective RF grounds for these solder joints 514, 516 may be located on the under-side of the antenna element PCB (e.g., solder joints 518, 520 shown in FIG. 5, part (b)). For example, the geometry of the RF grounds on the bottom side of the antenna 500 may be symmetrical to the geometry of the solder pad 610 on the top side of the antenna 500, including corresponding ground solder joints, ground conducting strips, and second shunt stub.

Assembly of the antenna 100 may include, for example, use of a soldering iron, e.g., a 750° F. fine-tipped soldering iron. The use of a solder mask at all electrical, e.g., RF, solder connection locations 514, 516, 518, 520 may concentrate the solder, and therefore the heat, to the pads. Mechanical solder connection locations 506, 508, 510, 512, however, may be much larger than the electrical connection locations 514, 516, 518, 520, and may have thermal relief. Metal, e.g., copper, may be voided (e.g., have an opening) around the mechanical solder connection locations 506, 508, 510, 512, e.g., for fast and easy attachment of the antenna element 500 to the host PCB 502. On one example, a fixture may locate the host PCB 502 and the antenna PCB 501, and the mechanical solder connection locations 506, 508, 510, 512 may be soldered first. The position and extent of the mechanical solder joints 506, 508, 510, 512 and extent of the copper opening or void in the host PCB 502 maintain proper operation of the array.

Figure 7:
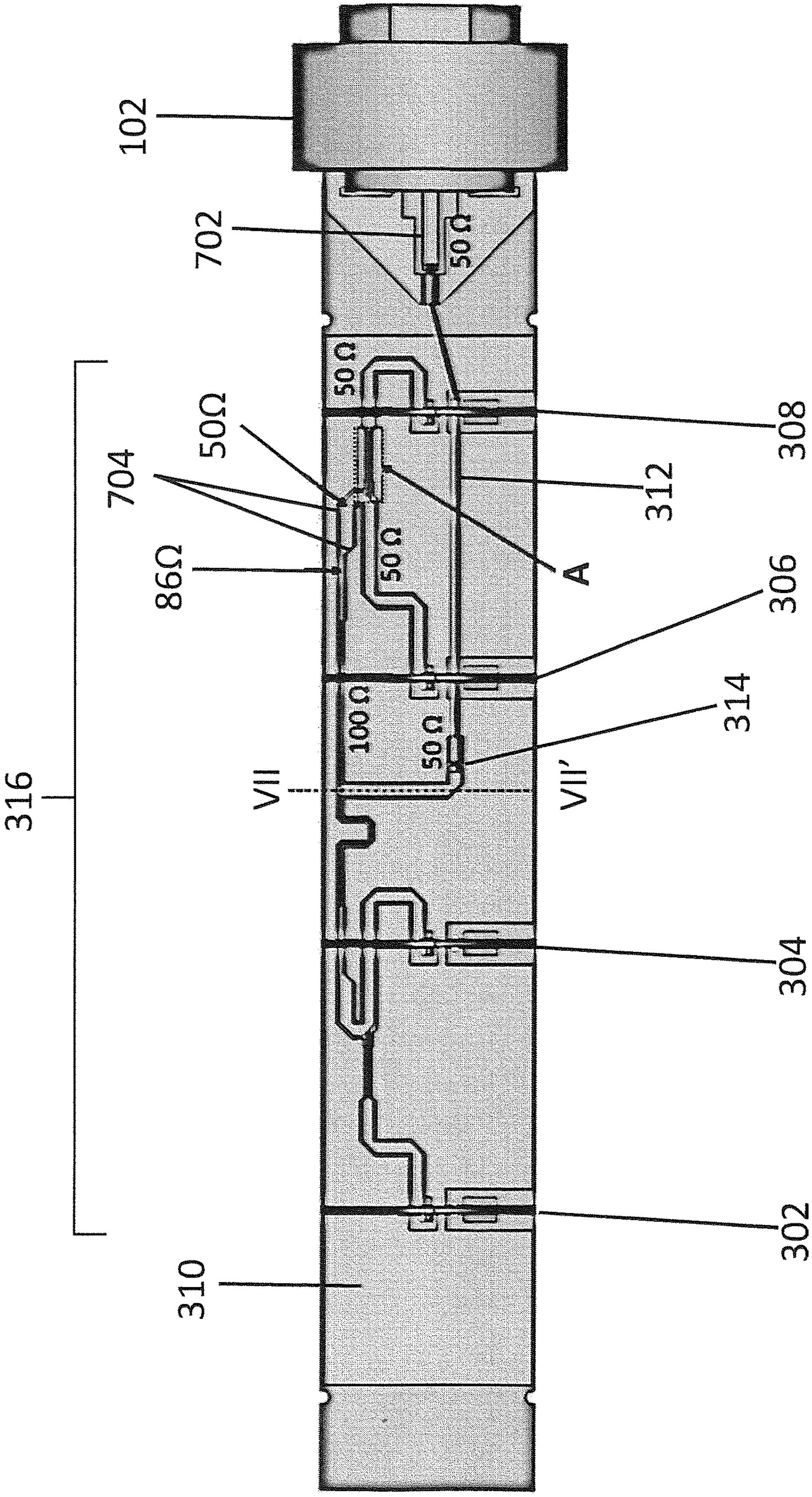
FIG. 7 is a perspective view of an antenna according to an embodiment.
Figure 8:
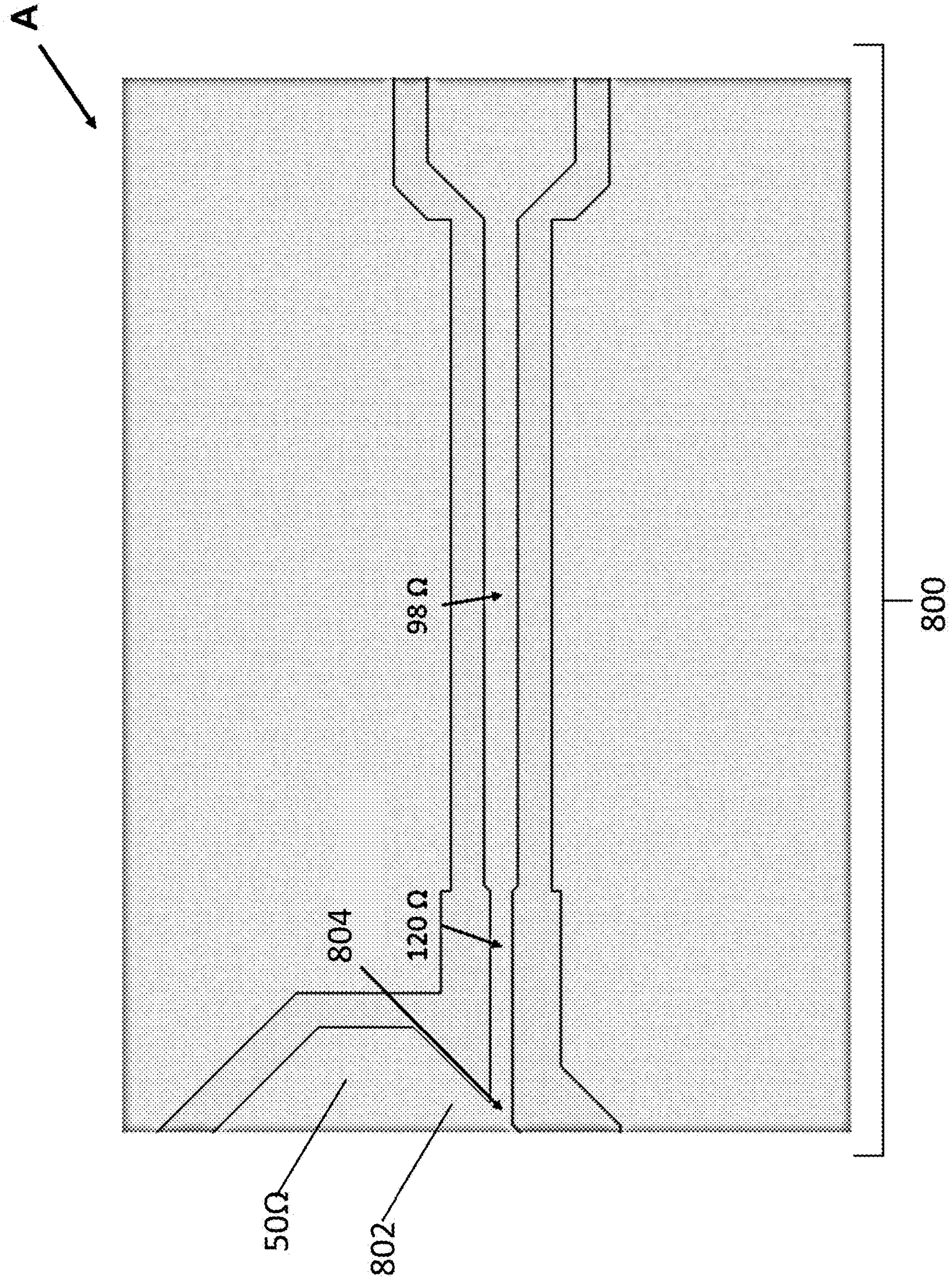
FIG. 8 is an expanded view of an area 'A' of FIG. 7.

A configuration of the feed network 316 that may convey the energy to is illustrated in FIG. 7. An expanded view of an area 'A' of FIG. 7 is illustrated in FIG. 8, which shows an amplitude taper 800. The characteristic impedances are symmetric with respect to the dashed line VII-VII'—centered about a first power division—and like-lines have the same length with respect to this split.

An interconnect may be provided that is configured to convey a radio frequency (RF) signal at characteristic impedance Z0. A common port may be provided that is configured to receive the RF signal and split off into first and second 2*Z0 transmission lines to form an equal power division at a first power split, each of the first and second 2*Z0 transmission lines being configured to step into Z01/2 at a second power split using a multi-section transformer 704 including a 0.5√(2)*Zhigh line and a first Z0 line, the first Z0 line dividing power at the second power split to form a Zhigh line and a second Z0 line at a chamfer, the Zhigh line extending from an antenna taper location that is more than halfway down the chamfer from the second power split, the Zhigh line stepping into a third Z0 line using a 2*Z0 transformer, with Zhigh being at least 2.25*Z0. All generalized line impedances may be accurate to within +/−5 ohms (Ω).

For example, an N-connector may be soldered into a 5002 trace that may transition to a 1.13 mm (outer diameter) micro-cable 702. The interconnect 312, e.g., a jumper cable, may route through holes, e.g., the interconnect clearance hole 522 shown in FIG. 5, in the antenna elements 302, 304, 306, 308, and may be soldered to the host PCB 310 at the common port 314 of the feed network 316. The common port 314 may split off into two 100Ω transmission lines to form an equal power division. Each 100Ω transmission line may step into 35Ω at the point of the next power split using a multi-section transformer 704 formed of 86Ω and 50Ω lines. 50Ω and 120Ω lines then divide the RF power at the split. The 120Ω line may be formed from an 8 mil-wide trace and an increased gap-to-ground distance of 16 mils. A zoomed-in view of this unequal power division is shown in FIG. 8. The chamfer 802 should be "tapped" in a correct location to achieve the desired s-parameter characteristics. The resulting tap location 804 is a little further than halfway down the chamfer from the power split. As illustrated in FIG. 8, the 120Ω trace may then step into 50Ω, e.g., using a 98Ω transformer. Finally, both 50Ω traces may route to the antenna ports, e.g., at solder joint 610 of FIG. 6 of the antenna element 500 of FIG. 5.

Figure 9:
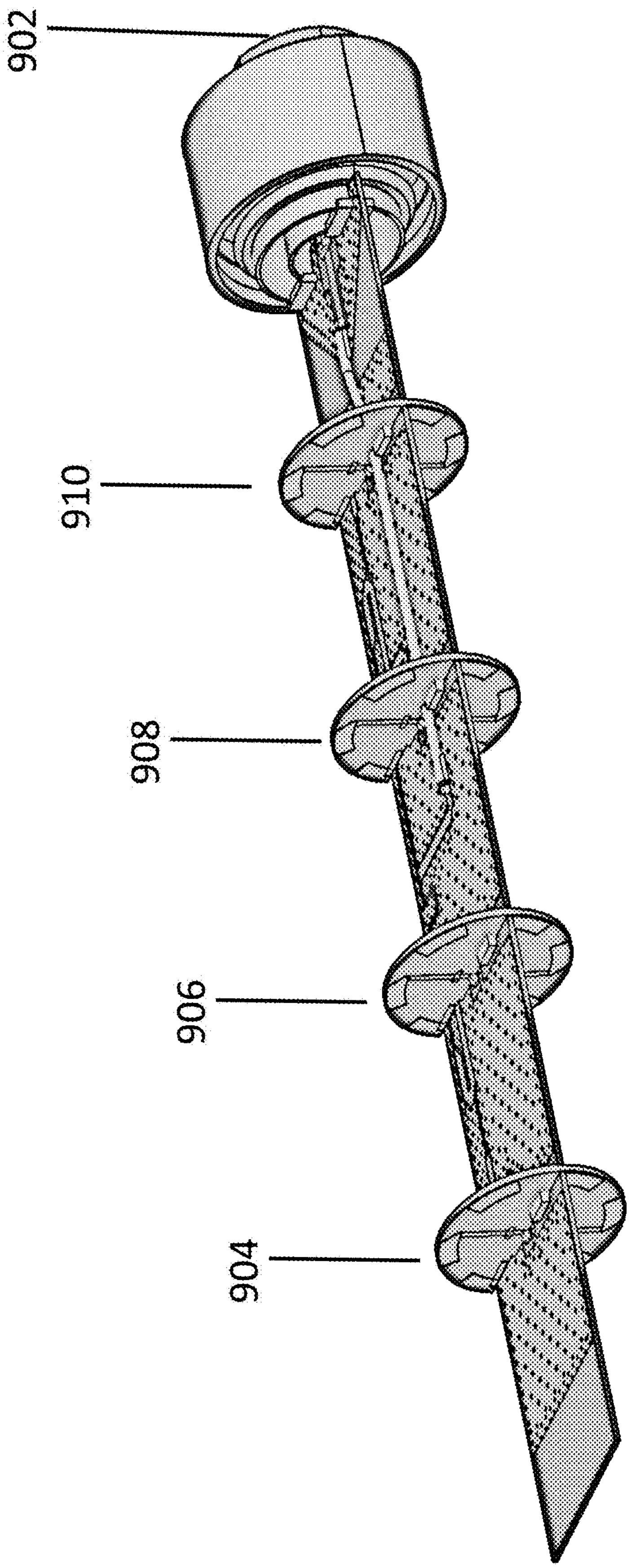
FIG. 9 is a perspective view of a model of an antenna according to an embodiment.
Figure 10:
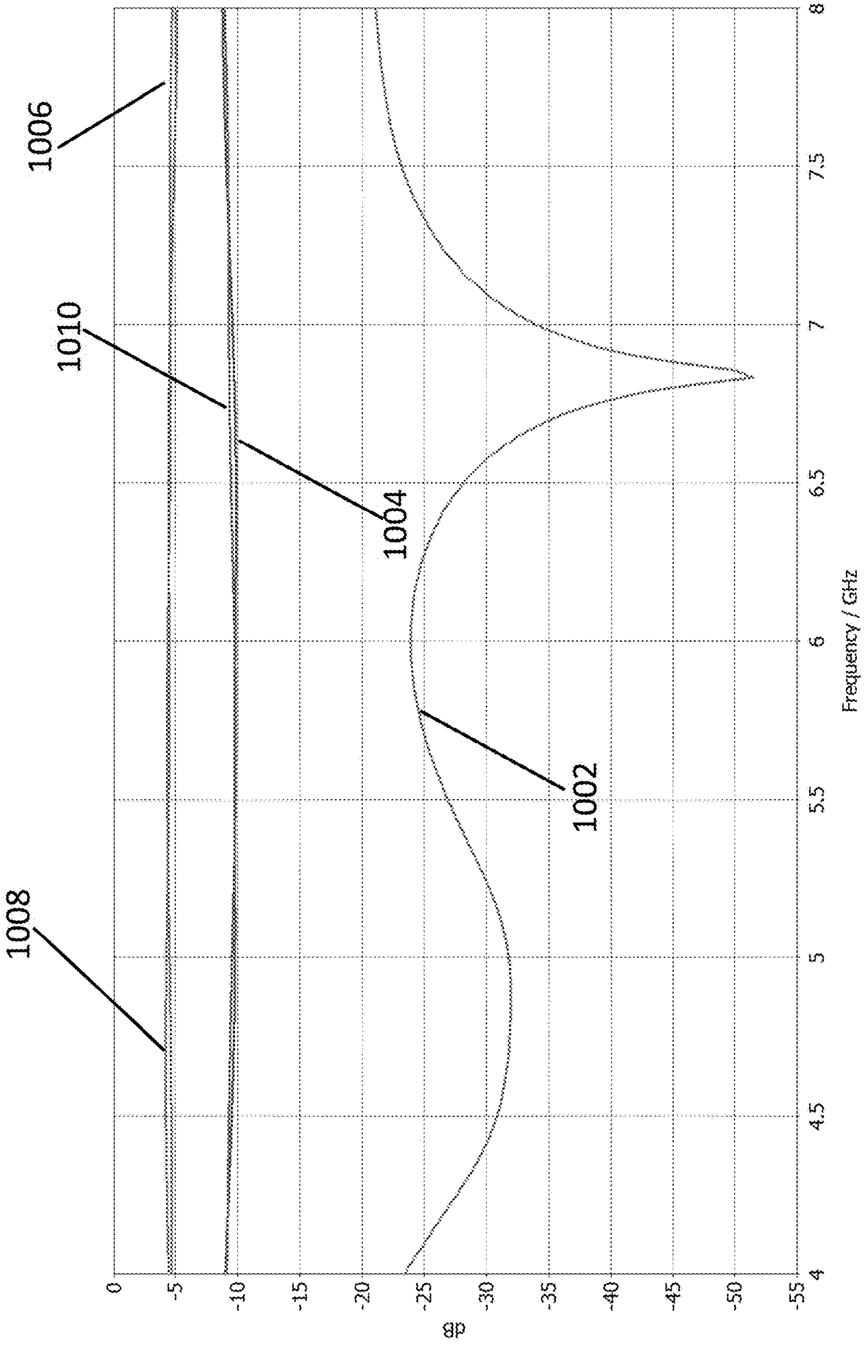
FIG. 10 is a graph of s-parameters of a truncated feed network according to an embodiment.

A simulation model 900 is illustrated in FIG. 9. Experimental results obtained using the model 900 also included using a radome, although a radome is not shown in FIG. 9 for convenience of illustration. Scattering parameters of the simulation model 900 shown in FIG. 9 are shown in the FIG. 10 graph. FIG. 10 is a graph of s-parameters of a truncated feed network according to an embodiment. FIG. 10 illustrates the simulated s-parameter results of amplitude taper 800. Plot 1002 corresponds to the return loss of a common port, e.g., port 204 of FIG. 2. Plots 1006 and 1008 correspond to the coupling from the common port to the two middle antennas 906 and 908 (e.g., antennas 304 and 306 of FIG. 3), and plots 1004 and 1010 correspond to the coupling from the common port to the two edge antennas 904 and 910 (e.g., antennas 302 and 308 of FIG. 3). Excellent return loss and tapering are demonstrated in an operational band from 4-8 GHz. Given the skyward radiation limit, element spacing, and variation in beamwidth over the operational bandwidth, it is desirable that the antenna 100 should have a 5 dB amplitude taper.

Figure 11:
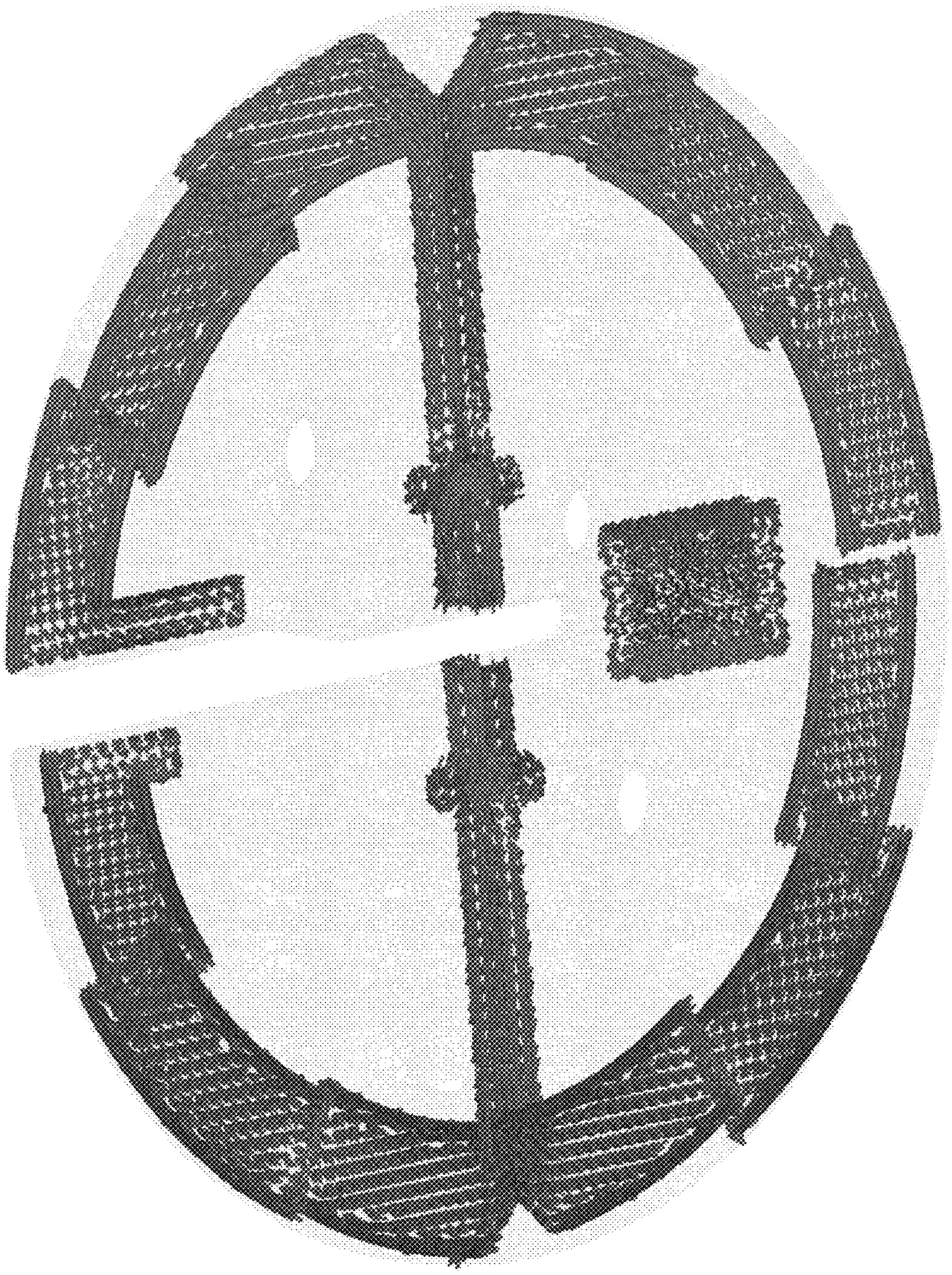
FIG. 11 is perspective view of a simulation result using the model of FIG. 9.

A loop antenna that has a balanced (e.g., constant amplitude) and uniform (e.g., constant phase) circular current distribution radiates an omnidirectional radiation pattern in its azimuth plane (e.g., E-plane). The simulated current distribution of one of the center elements at 5785 MHz is shown in FIG. 11. It is observed that the current distribution is balanced and uniform over the extent of the loop. Also, for each small radiating portion of the loop there exists a diametrically-opposed radiation contribution that is 180° out-of-phase that cancels out the former contribution at the center of the loop. Thus, the electric field must vanish, or nearly vanish, at the center of the loop. Thus, it may be possible to flood the host PCB 310 with ground to produce a reflector with small, minimal, or no impact to the operation of the loop antenna, e.g., the antenna 100. Thus, an antenna element 500 may use the host PCB 502 as a reflector to produce a sector-type radiation pattern on both sides of the host PCB 502. Omnidirectional coverage may be achieved, for example, by shaping the loop structure, strip overlap, the distance of the loop from the host PCB 502, and the width of the host PCB 502 ground plane 604.

As such, the antenna 100 according to an embodiment uses the strip pullback and length compensation on the antenna element 500 to achieve better decoupling from the transmission lines 316 that route past the antenna element 500 and a more uniform current distribution, given the modifications to the antenna element 500. The amplitude taper 800, e.g., tapping 804 the $Z_0$, e.g., 50Ω, right angle chamfer 802 to produce the taper 800. The feed of the antenna element 500 is a single coplanar waveguide transmission line that splits into two paired-strip transmission lines 608 on the antenna element 500. This is made possible by creating a window 602 in the ground plane 604 of the host PCB 502. Furthermore, the antenna element 500 may include the thermally-relieved mechanical connection of the mechanical solder joints 506, 508, 510, 512 to physically connect the antenna PCB 501 to the host PCB 502. This was made possible by an opening 612 in the host PCB 502 ground flood 604 (metal-flooded ground plane). The placement of this structure maintains good pattern performance and allows the interconnect 314, e.g., the jumper cable, to route through the antenna PCBs 501 of the lower two antenna elements 306, 308 of FIG. 3.

Table 1 below shows specifications of the simulation model 900.

TABLE 1

| Design Parameter | Design Targets | 4.9 GHz Specs | 5 GHz Specs | 6 GHz Specs | Comment |
|---|---|---|---|---|---|
| Frequency | 4900-6900 MHz | 4940-4990 MHz | 5150-5875 MHz | 5925-6875 MHz | 4.9 GHz performance projected from simulation data, not directly simulated |
| Nominal Input Impedance | 50 Ω | 50 Ω | 50 Ω | 50 Ω | — |
| Maximum VSWR | 1.5:1 | 1.5:1 | 1.5:1 | 1.5:1 | — |
| Polarization | Horizontal | Horizontal | Horizontal | Horizontal | — |
| Peak Gain | 7 dBi | 7 dBi | 7 dBi | 7 dBi | — |
| SLL 30° Above & Below the Horizon | <−15 dB | N/A | <−15 dB | <−15 dB | Allowable peak EIRP is 36 dBm; max. skyward EIRP is 21 dBm (−15 = 21 − 36). |
| Azimuth Plane Ripple | <3 dB | <4 dB | <3 dB | <2 dB | Typical values |
| Elevation Plane Beamwidth | 15° < BMW < 30° | 30° | 25° | 22° | Typical values |

Figure 12:
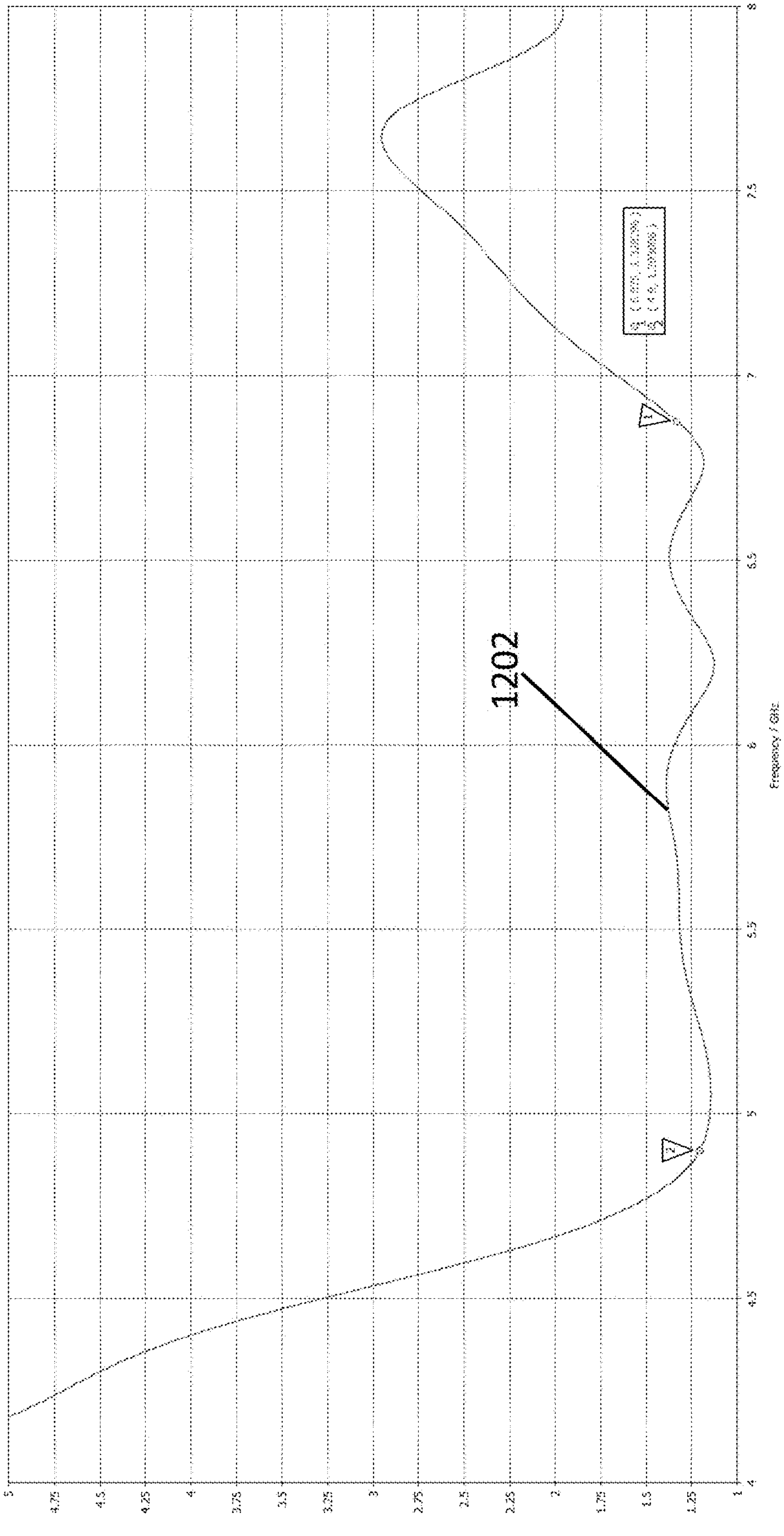
FIG. 12 is a graph of simulation results for a voltage standing wave ratio (VSWR) across an operational band using a simulation model based on the model of FIG. 9.
Figure 13:
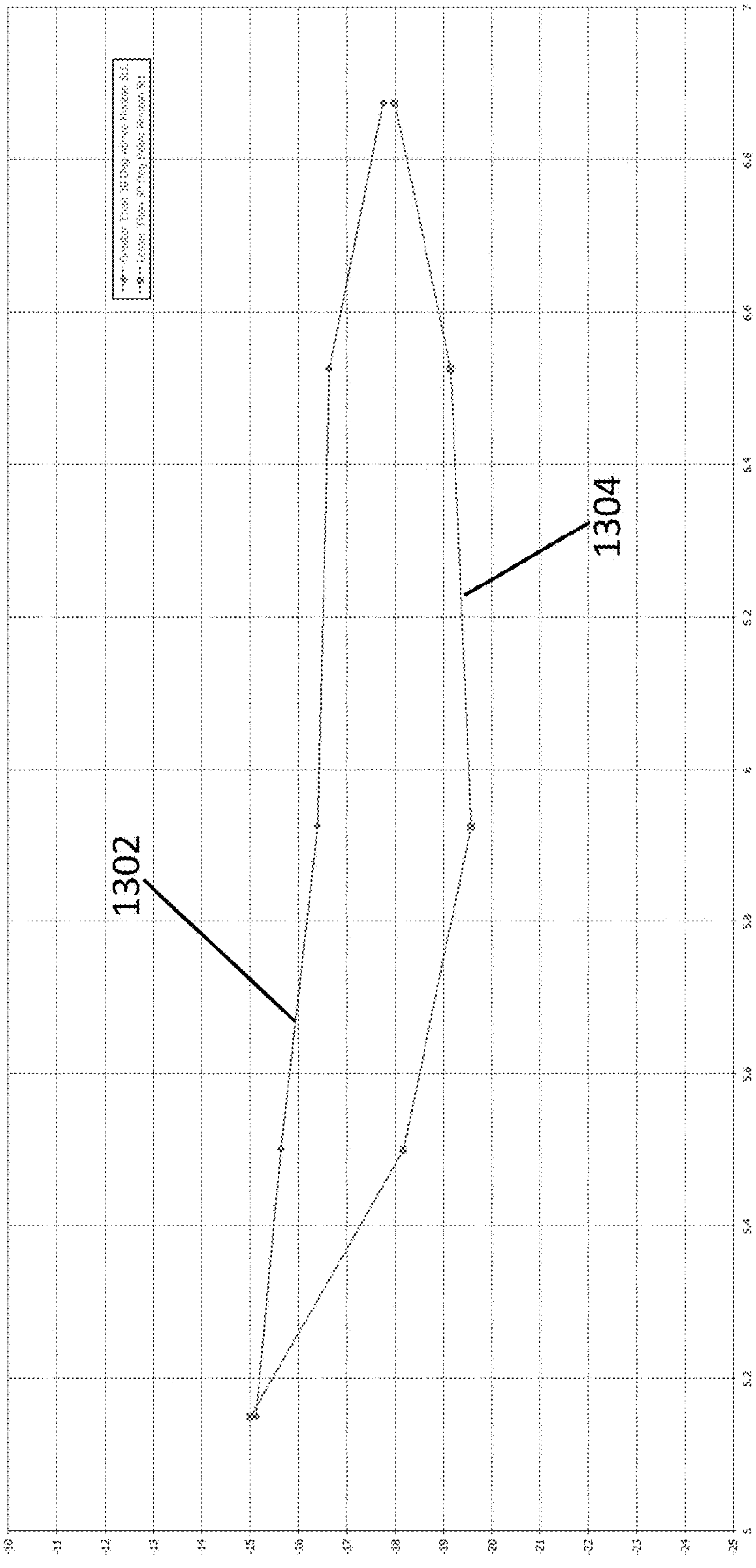
FIG. 13 is a graph of simulation results for a sidelobe level (SLL) at ≥30° above and below the horizon across an operational band using the model of FIG. 9.
Figure 14:
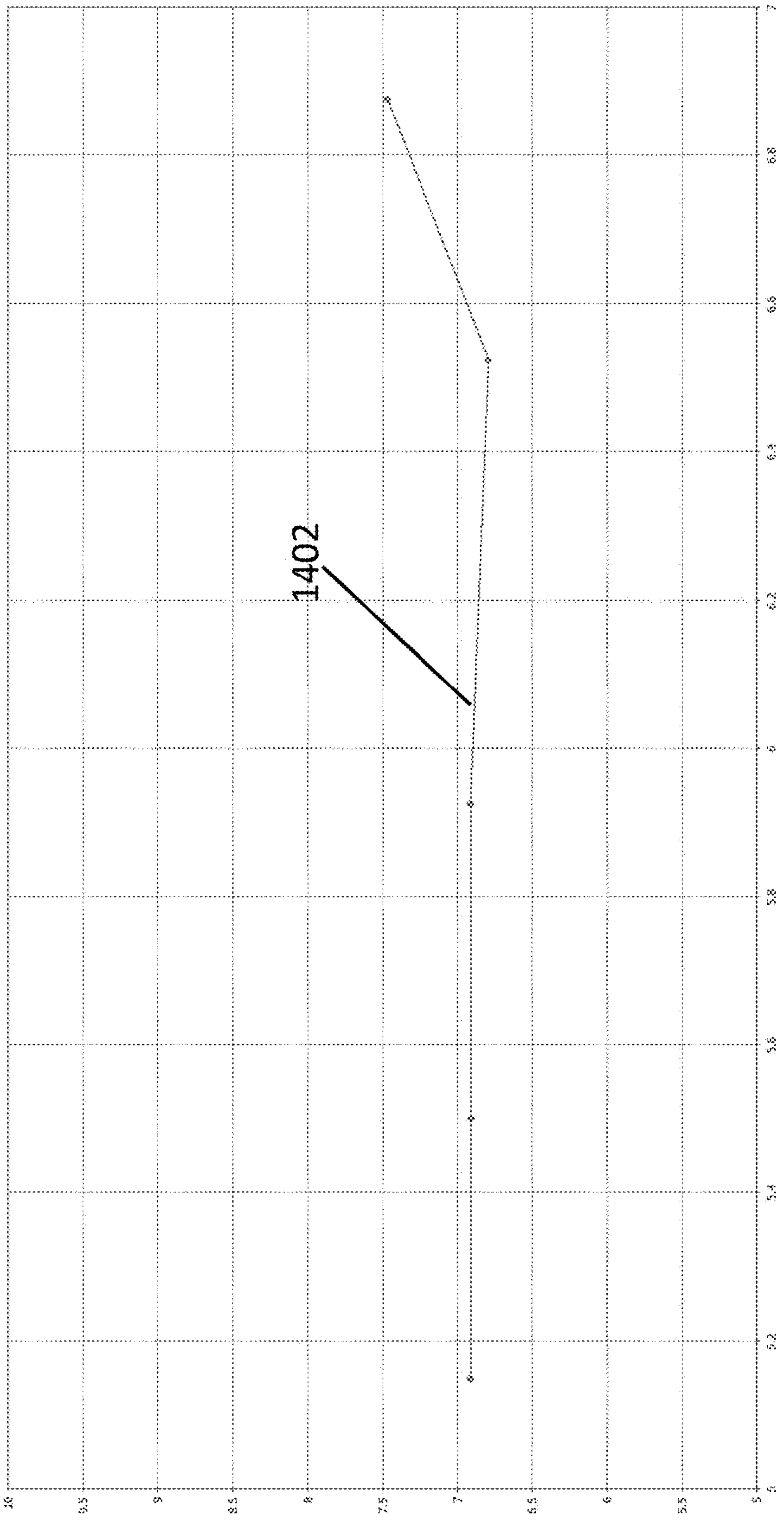
FIG. 14 is a graph of simulation results for a realized peak gain across an operational band using the model of FIG. 9.
Figure 15:
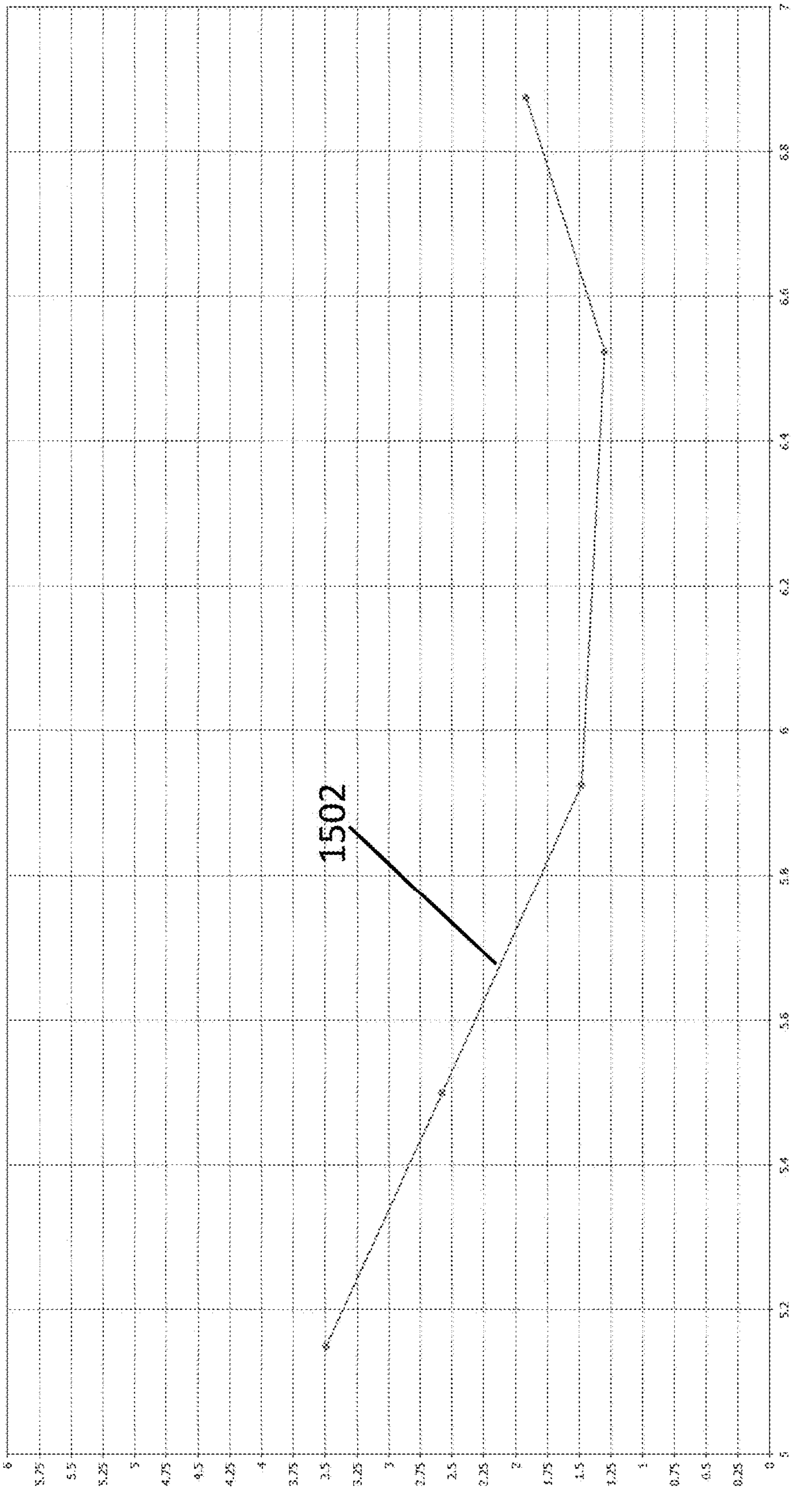
FIG. 15 is a graph of simulation results for an azimuth plane ripple across an operational band using the model of FIG. 9.
Figure 16:
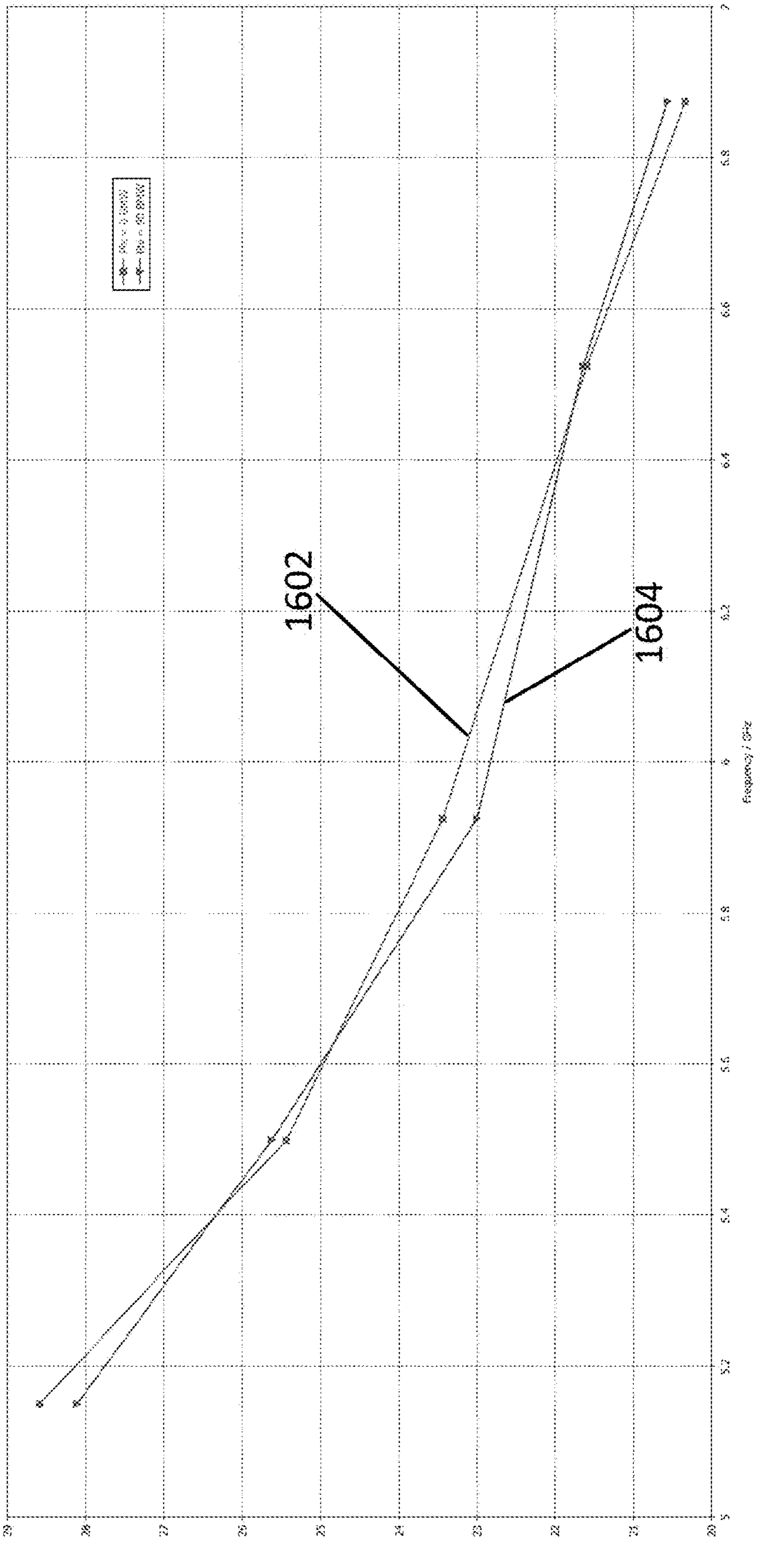
FIG. 16 is a graph of simulation results for elevation plane beamwidths across an operational band using the model of FIG. 9.
Figure 17:
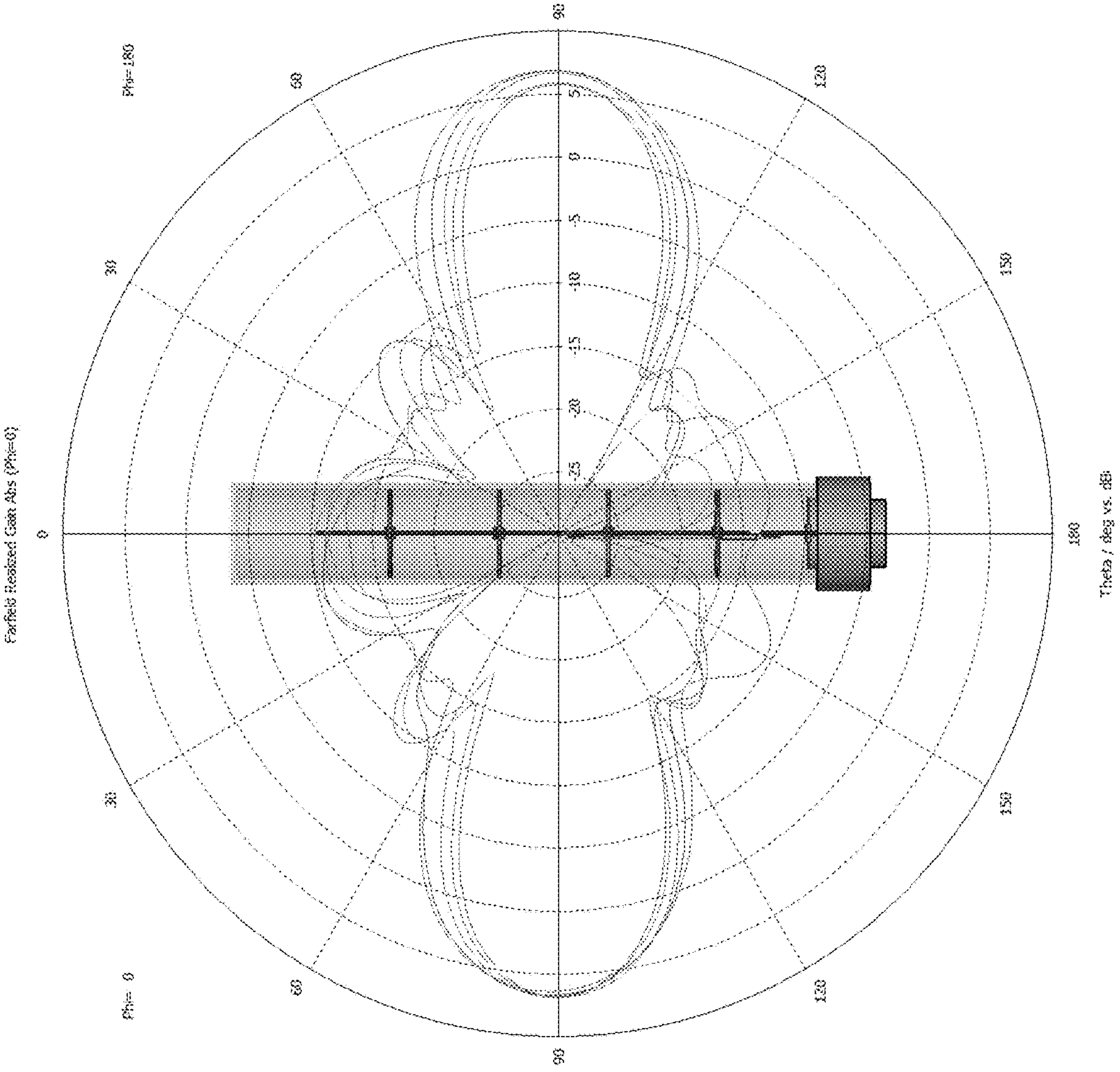
FIG. 17 is a graph of far-field realized gain radiation patterns in the phi (Φ)=0° (or phi (Φ)=180°) elevation plane far-field using the model of FIG. 9.
Figure 18:
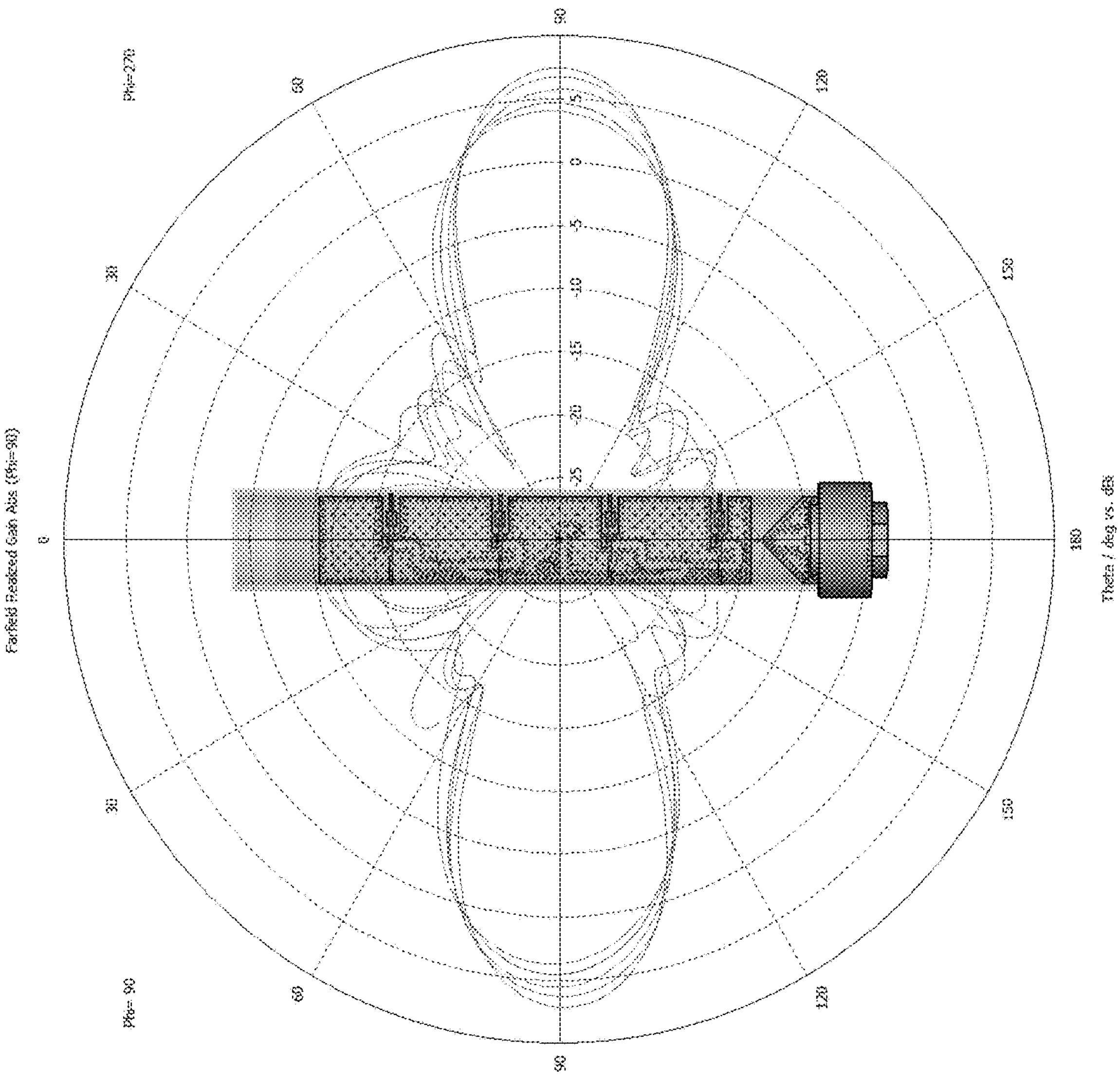
FIG. 18 is a graph of simulation results for elevation plane radiation patterns for far-field realized gain at phi (Φ)=90° (or phi (Φ)=270°) using the model of FIG. 9.
Figure 19:
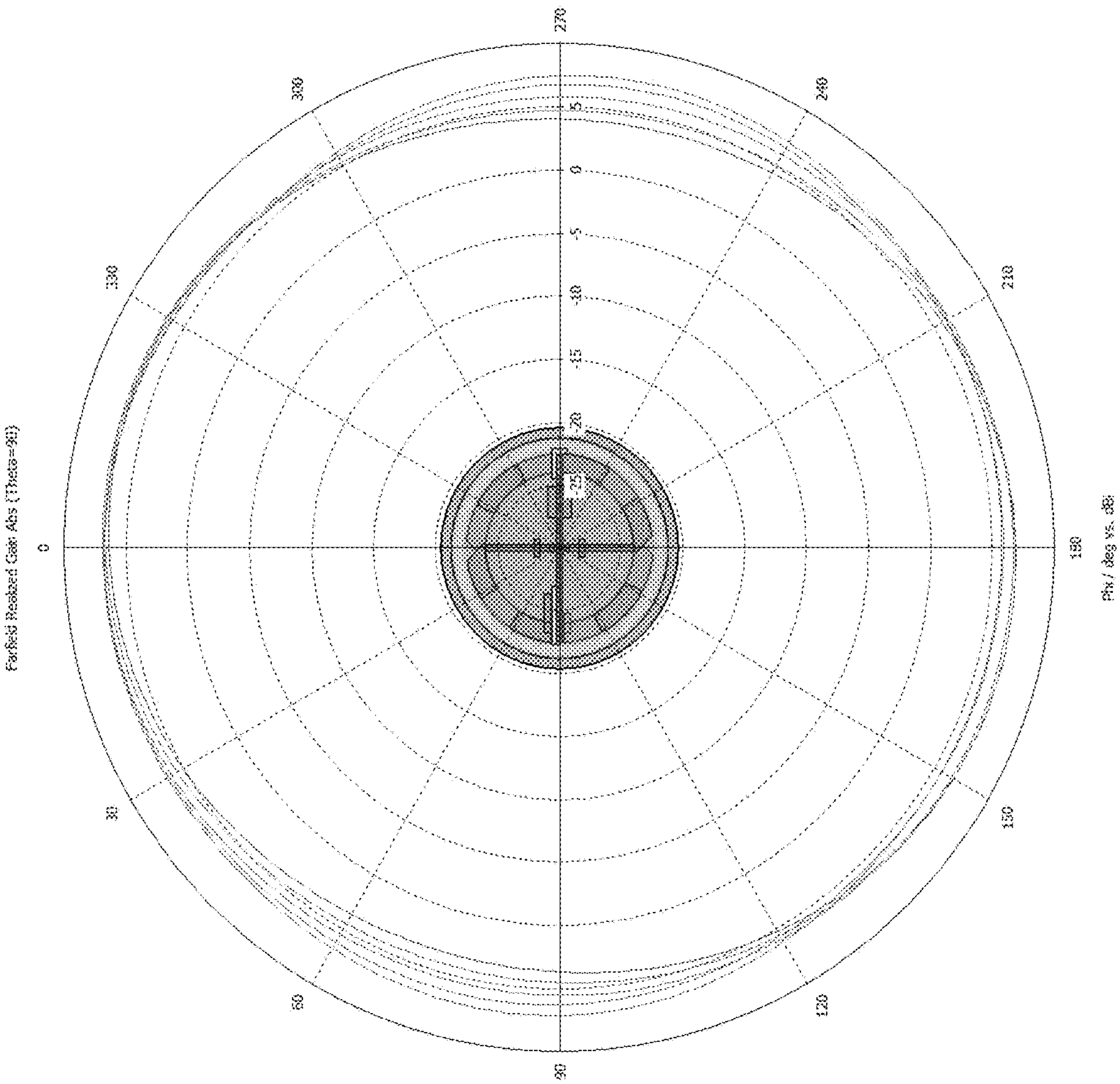
FIG. 19 is a graph of simulation results for azimuth plane radiation patterns for far-field realized gain at theta (θ)=90° using the model of FIG. 9.

FIGS. 12-19 show additional simulation results using the simulation model 900 of FIG. 9. FIG. 12 shows a voltage standing wave ratio (VSWR) at curve 1202 across the operational band of 4-8 GHz. FIG. 13 shows a sidelobe level (SLL) at ≥30° above and below the horizon across the operational band. The sidelobe level is a difference between the peak gain of the skyward region versus the peak gain in the simulated antenna. In FIG. 13, curve 1302 shows the SLL of the upper hemisphere, and curve 1304 shows the SLL of the lower hemisphere. FIG. 14 shows a realized peak gain at curve 1402 across the operational band. FIG. 15 shows an azimuth plane ripple at curve 1502 across the operational band. FIG. 16 shows elevation plane beamwidths across the operational band. In FIG. 16, curve 1602 shows the beamwidth when phi (Φ)=0°, and curve 1604 shows the beamwidth when phi (Φ)=90°. Phi (Φ) refers to the spherical coordinate that subtends from the x-axis in the azimuth plane, e.g., elevation plane cuts. Both phi (Φ)=0 and phi (Φ)=90 cut through the antenna along the body of the antenna. Phi (Φ)=0 is the x-z plane and phi (Φ)=90 is the y-z plane. FIG. 17 shows elevation plane radiation patterns for far-field realized gain at phi (Φ)=0° (or phi (Φ)=180°). FIG. 18 shows elevation plane radiation patterns for far-field realized gain at phi (Φ)=90° (or phi (Φ)=270°). FIG. 19 shows azimuth plane radiation patterns for far-field realized gain at theta (θ)=90°. Theta (θ)=90° is the azimuth plane, e.g., perpendicular to the orientation of the antenna, which is a cross-section of the antenna, e.g., an x-y plane.

FIGS. 20-27 show measured experimental results using prototype antennas constructed according to an embodiment. All radiated data was measured in a calibrated MVG SG-24 fully anechoic chamber. The chamber was calibrated using an SH-800 standard gain horn using the gain substitution method. The conducted data (return loss/VSWR) was measured using a Keysight E5071C ENA that was calibrated to a 50 Ohm reference impedance using a Keysight 85052D calibration kit.

Figure 20:
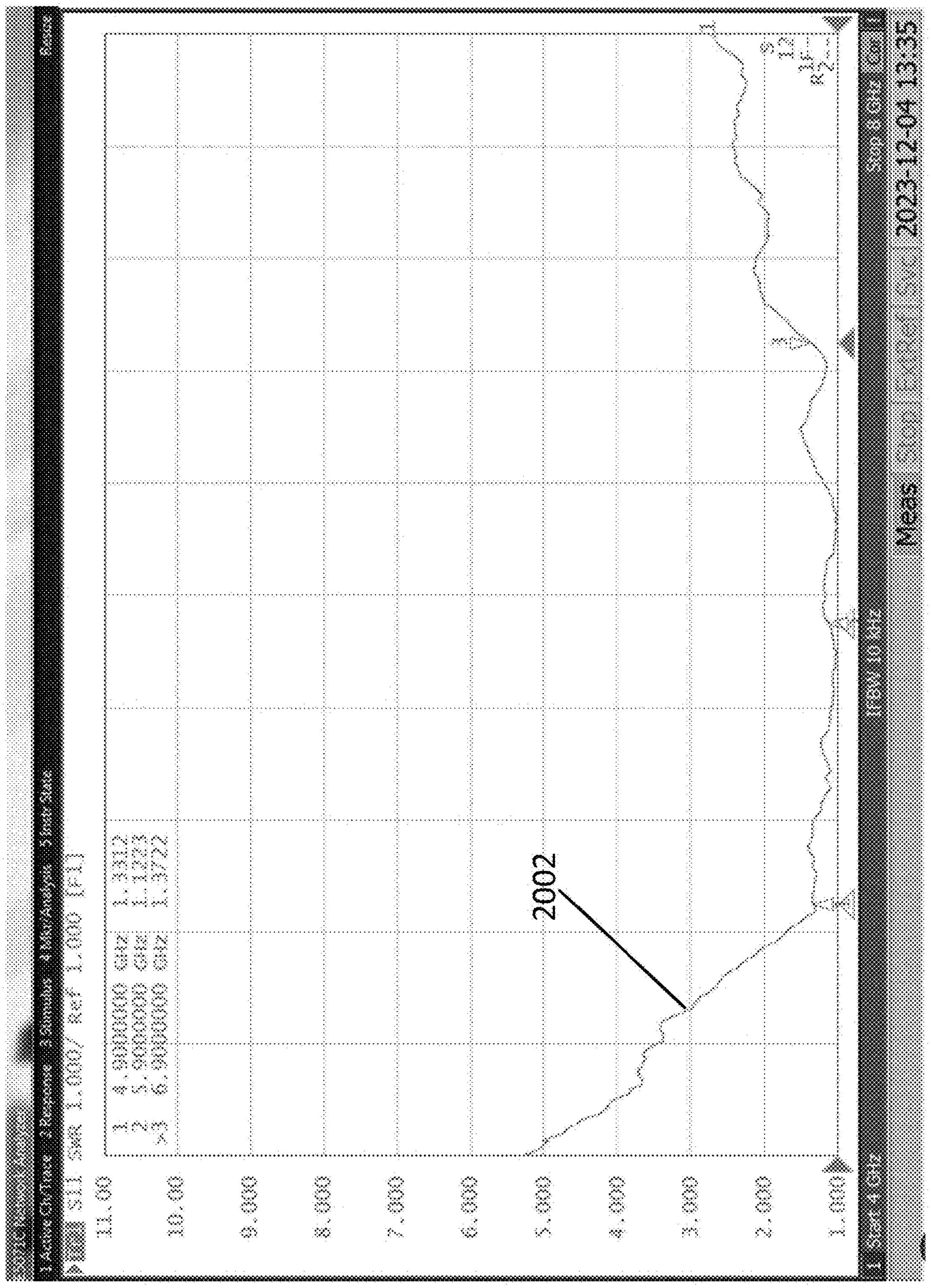
FIG. 20 is a screenshot of experimental results of a VSWR across an operational band for a prototype.
Figure 21:
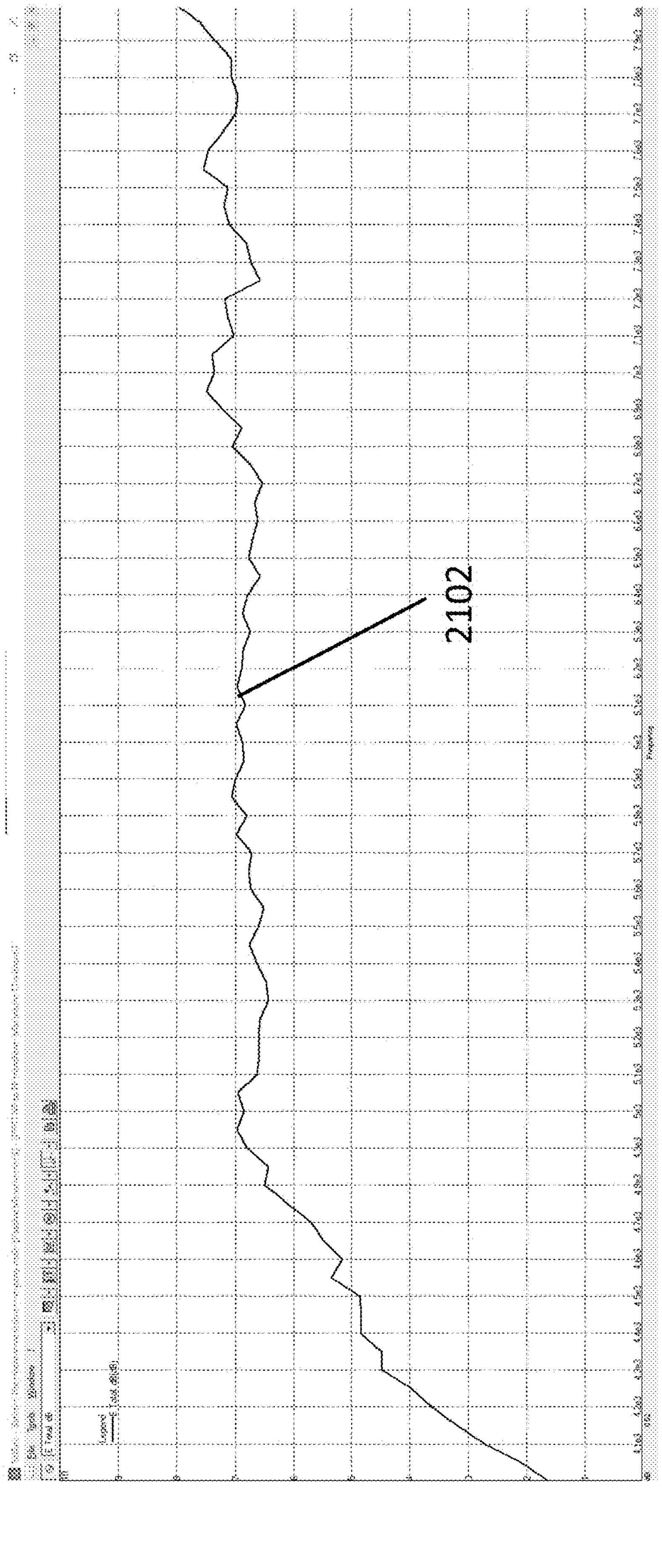
FIG. 21 is a screenshot of experimental results of a peak gain across an operational band for a prototype.
Figure 22:
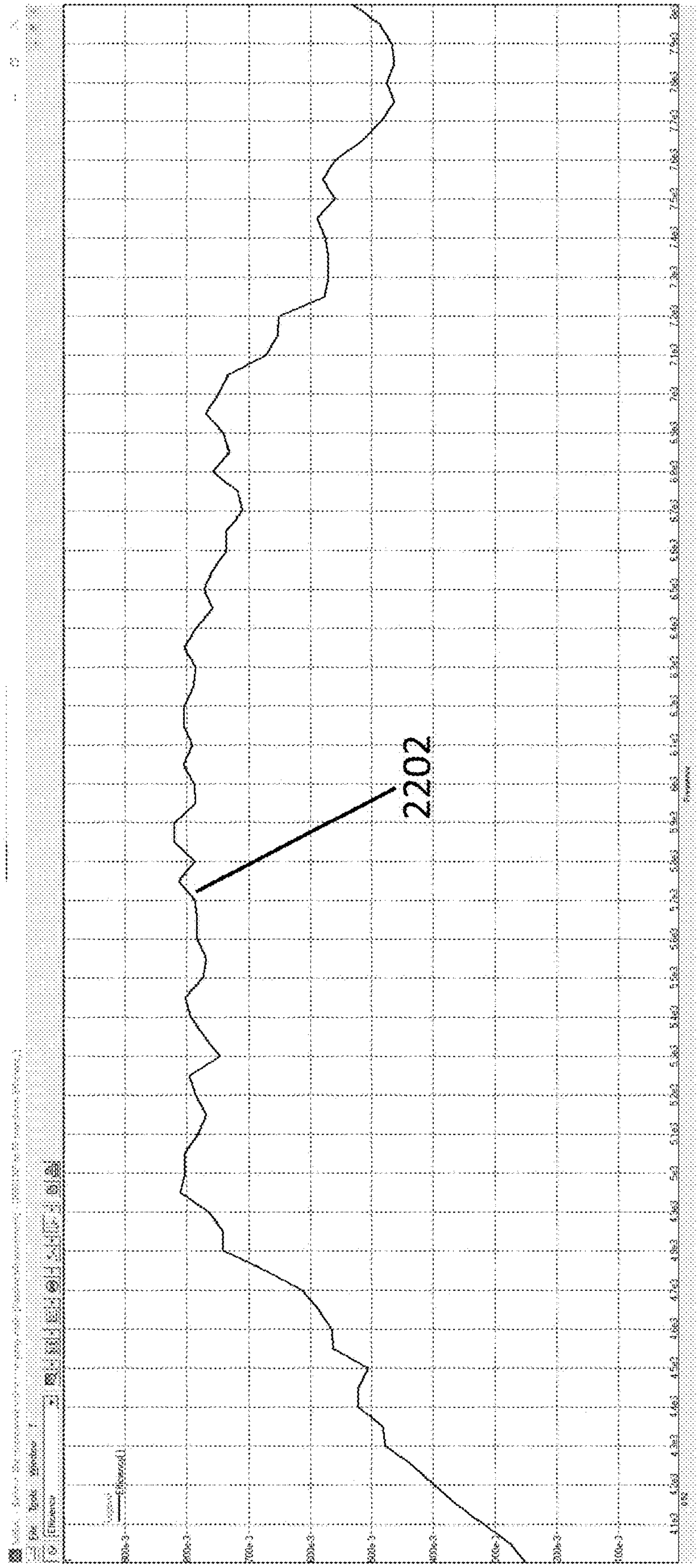
FIG. 22 is a screenshot of experimental results of a total efficiency across an operational band for a prototype.
Figure 23:
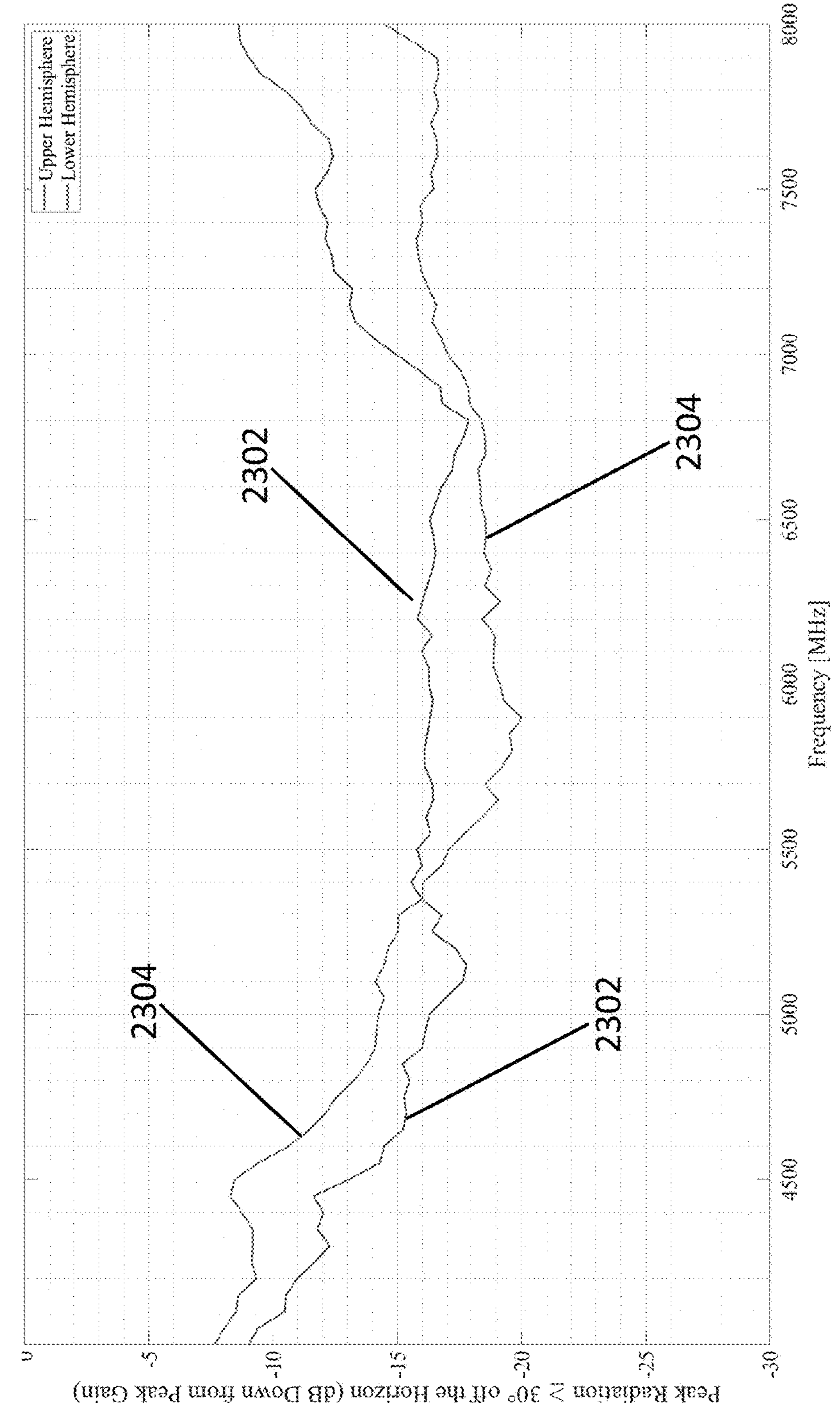
FIG. 23 is a graph of experimental results of an upper hemisphere SLL and a lower hemisphere SLL across an operational band for a prototype.

FIG. 20 shows a screenshot of a network analyzer of a VSWR at curve 2002 across an operational band of 4-8 GHz. FIG. 21 shows a screenshot of a peak gain at curve 2102 across the operational band of 4000-8000 MHz. FIG. 22 shows a screenshot of a total efficiency at curve 2202 across the operational band of 4000-8000 MHz. FIG. 23 shows a graph of an upper hemisphere SLL at curve 2302 and a lower hemisphere SLL at curve 2304 across the operational band of 4000-8000 MHz.

Figure 24:
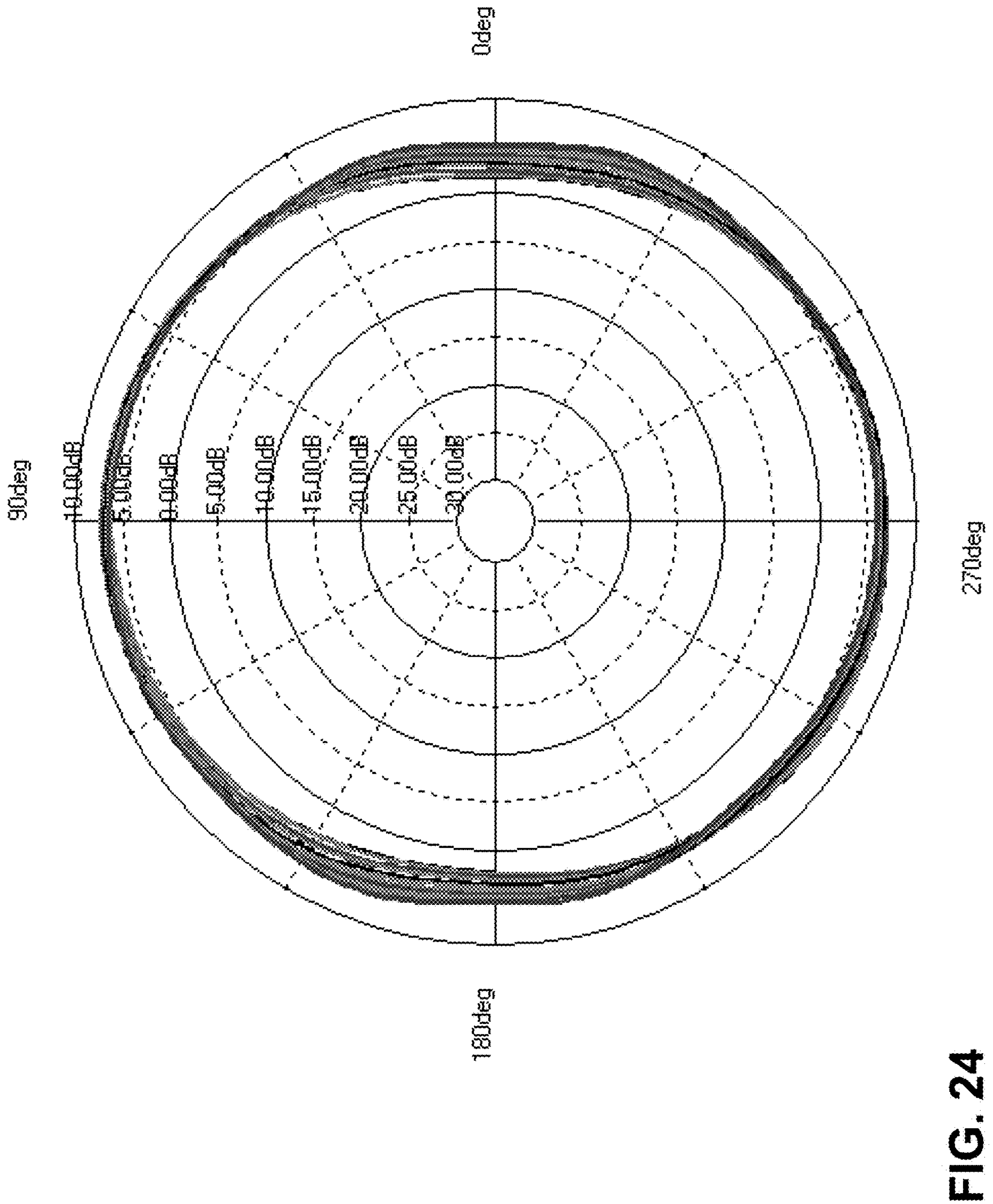
FIG. 24 is a graph of experimental results of azimuth plane radiation patterns for realized gain at theta (θ)=90° for a prototype.
Figure 25:
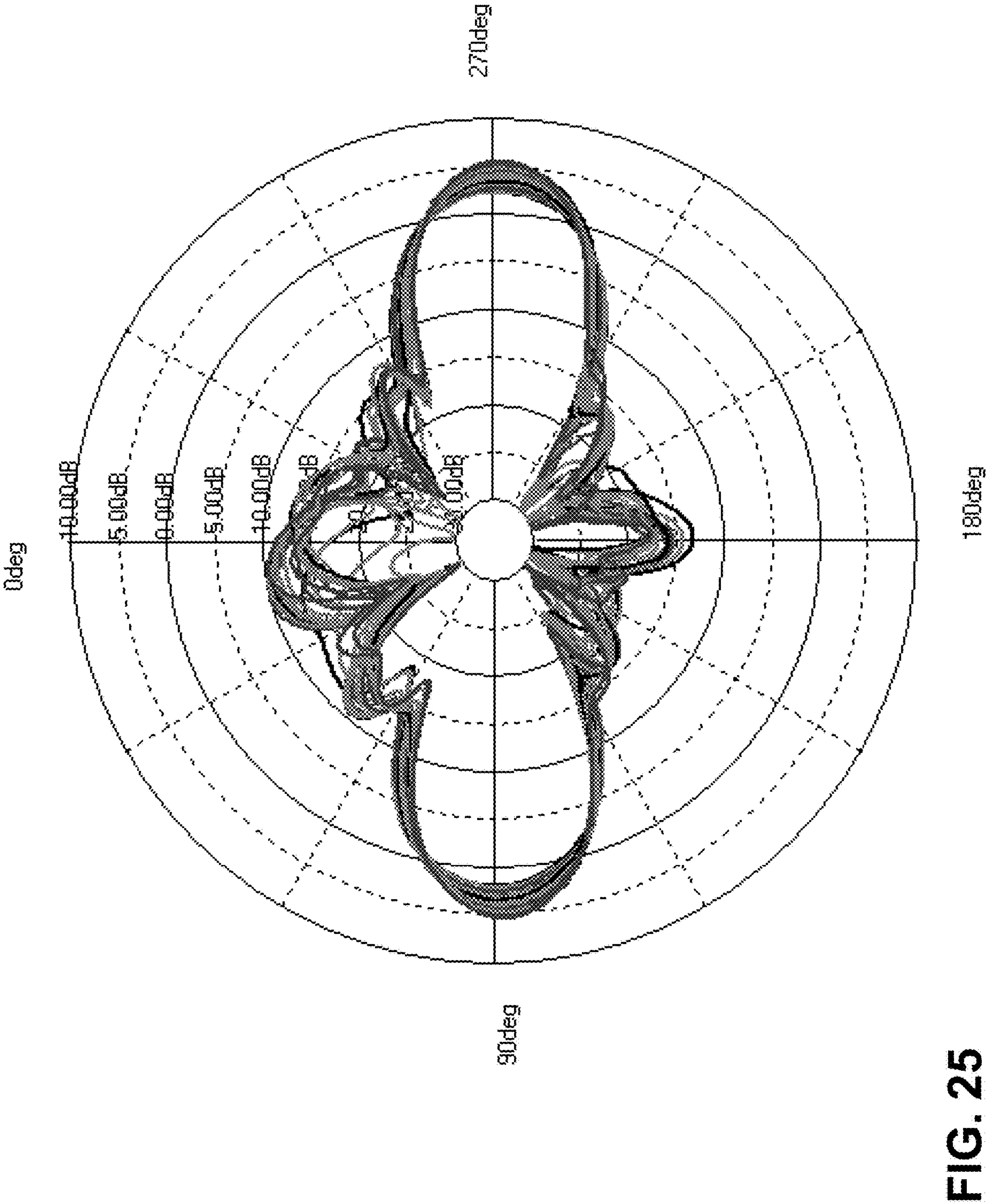
FIG. 25 is a graph of experimental results of elevation plane radiation patterns for realized gain at phi (Φ)=0° for a prototype.
Figure 26:
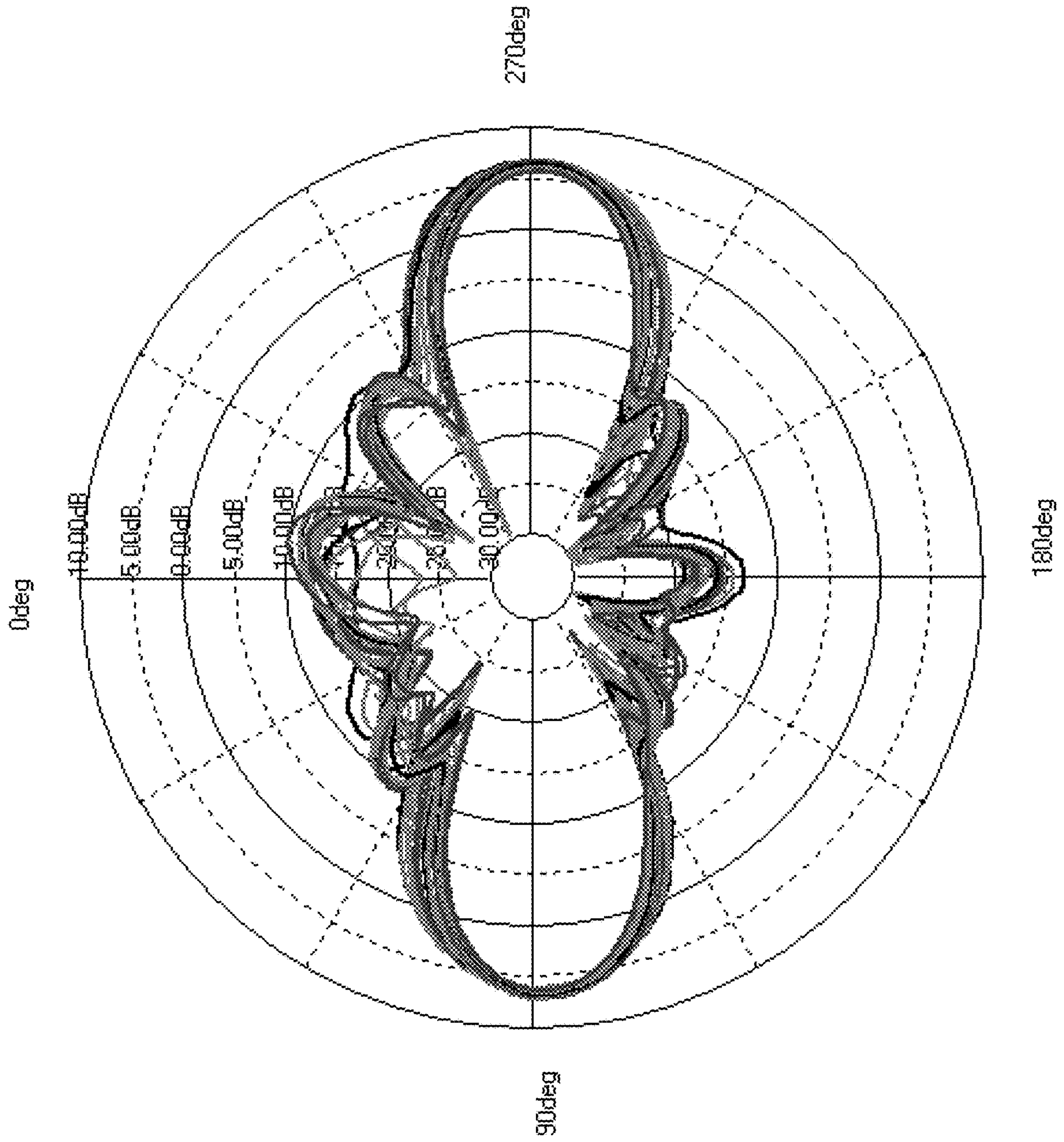
FIG. 26 is a graph of experimental results of elevation plane radiation patterns for realized gain at phi (Φ)=90° for a prototype.

FIG. 24 shows a graph of azimuth plane radiation patterns for realized gain at theta (θ)=90°. Table 2 below shows a chart with measured values of the azimuth plane radiation patterns for realized gain at theta (θ)=90° of FIG. 24 from the experimental results using a prototype at 4900-6900 MHz. FIG. 25 shows a graph of elevation plane radiation patterns for realized gain at phi (Φ)=0°. Table 3 below shows a chart with measured values of the elevation plane radiation patterns for realized gain at phi (Φ)=0° of FIG. 25 from the experimental results using a prototype at 4900-6900 MHz. FIG. 26 shows a graph of elevation plane radiation patterns for realized gain at phi (Φ)=90°. Table 4 below shows a chart with measured values of the elevation plane radiation patterns for realized gain at phi (Φ)=90° of FIG. 26 from the experimental results using a prototype at 4900-6900 MHz.

TABLE 2

| Layer | Max value | Position | Min val . . . | Position | Beam . . . | Max/Min | Average | Standard |
|---|---|---|---|---|---|---|---|---|
| 4950(MHz) | 6.97 dB | 256.94 deg | 1.81 dB | 359.00 . . . | 125.55 d . . . | 5.16 dB | 4.84 dB | |
| 5050(MHz) | 6.94 dB | 256.94 deg | 1.99 dB | 359.00 . . . | 128.38 d . . . | 4.95 dB | 4.83 dB | 1.51 |
| 5150(MHz) | 6.57 dB | 256.94 deg | 1.97 dB | 359.00 . . . | 133.92 d . . . | 4.59 dB | 4.70 dB | 1.41 |
| 5250(MHz) | 6.56 dB | 79.24 deg | 2.45 dB | 356.60 . . . | 140.36 d . . . | 4.11 dB | 4.96 dB | 1.31 |
| 5350(MHz) | 6.41 dB | 86.45 deg | 2.39 dB | 356.60 . . . | 146.54 d . . . | 4.02 dB | 4.89 dB | 1.24 |
| 5450(MHz) | 6.71 dB | 87.65 deg | 2.86 dB | 356.60 . . . | 149.27 d . . . | 3.84 dB | 5.17 dB | 1.16 |
| 5500(MHz) | 6.54 dB | 88.85 deg | 2.90 dB | 356.60 . . . | 152.83 d . . . | 3.63 dB | 5.04 dB | 1.10 |
| 5650(MHz) | 6.74 dB | 90.05 deg | 3.32 dB | 356.60 . . . | 161.53 d . . . | 3.42 dB | 5.31 dB | 0.99 |
| 5750(MHz) | 6.90 dB | 91.25 deg | 3.63 dB | 356.60 . . . | 168.20 d . . . | 3.26 dB | 5.56 dB | 0.92 |
| 5850(MHz) | 7.00 dB | 90.05 deg | 3.91 dB | 357.80 . . . | 351.19 d . . . | 3.08 dB | 5.73 dB | 0.84 |
| 5950(MHz) | 6.83 dB | 266.55 deg | 3.93 dB | 0.00 deg | — | 2.90 dB | 5.64 dB | 0.76 |
| 6050(MHz) | 6.88 dB | 92.45 deg | 4.23 dB | 359.00 . . . | — | 2.65 dB | 5.82 dB | 0.70 |
| 6150(MHz) | 6.83 dB | 92.45 deg | 4.42 dB | 0.00 deg | — | 2.40 dB | 5.85 dB | 0.63 |
| 6250(MHz) | 6.74 dB | 99.66 deg | 4.52 dB | 357.80 . . . | — | 2.23 dB | 5.81 dB | 0.59 |
| 6350(MHz) | 6.75 dB | 104.46 deg | 4.79 dB | 357.80 . . . | — | 1.96 dB | 5.92 dB | 0.53 |
| 6450(MHz) | 6.46 dB | 103.26 deg | 4.68 dB | 359.00 . . . | — | 1.78 dB | 5.70 dB | 0.51 |
| 6550(MHz) | 6.65 dB | 151.28 deg | 4.66 dB | 222.12 d . . . | — | 1.98 dB | 5.78 dB | 0.52 |
| 6650(MHz) | 6.64 dB | 154.89 deg | 4.52 dB | 222.12 d . . . | — | 2.12 dB | 5.71 dB | 0.52 |
| 6750(MHz) | 6.71 dB | 156.09 deg | 4.35 dB | 223.32 . . . | — | 2.36 dB | 5.67 dB | 0.55 |
| 6850(MHz) | 6.86 dB | 156.09 deg | 4.49 dB | 223.32 . . . | — | 2.37 dB | 5.81 dB | 0.53 |

TABLE 3

| Layer | Max value | Position | Min val . . . | Position | Beam . . . | Max/Min | Average | Standard |
|---|---|---|---|---|---|---|---|---|
| 4950(MHz) | 2.37 dB | −90.90 deg | −27.82 d . . . | −131.84 . . . | 28.13 deg | 30.19 dB | −8.77 dB | |
| 5050(MHz) | 2.52 dB | −90.90 deg | −37.68 d . . . | 158.33 d . . . | 27.81 deg | 40.20 dB | −9.14 dB | 9.73 |
| 5150(MHz) | 2.48 dB | −90.90 deg | −37.77 d . . . | −129.43 . . . | 27.45 d . . . | 40.25 dB | −9.43 dB | 10.13 |
| 5250(MHz) | 2.86 dB | −90.90 deg | −30.13 dB | −159.53 . . . | 27.01 deg | 32.99 dB | −8.95 dB | 9.27 |
| 5350(MHz) | 2.70 dB | −90.90 deg | −37.13 dB | −159.53 . . . | 27.34 d . . . | 39.84 dB | −8.79 dB | 9.46 |
| 5450(MHz) | 3.12 dB | −90.90 deg | −31.18 dB | −157.12 . . . | 26.53 d . . . | 34.29 dB | −8.53 dB | 9.24 |
| 5550(MHz) | 3.23 dB | −90.90 deg | −34.02 d . . . | 167.96 d . . . | 25.43 d . . . | 37.25 dB | −8.68 dB | 9.17 |
| 5650(MHz) | 3.53 dB | −90.90 deg | −33.21 dB | 170.37 d . . . | 24.77 d . . . | 36.74 dB | −8.59 dB | 9.17 |
| 5750(MHz) | 3.94 dB | −92.11 deg | −26.47 d . . . | −42.74 d . . . | 23.94 d . . . | 30.41 dB | −8.40 dB | 9.04 |
| 5850(MHz) | 4.23 dB | −90.90 deg | −35.21 dB | −29.50 d . . . | 23.11 deg | 39.44 dB | −8.36 dB | 9.35 |
| 5950(MHz) | 4.40 dB | −92.11 deg | −28.02 d . . . | 34.31 deg | 22.28 d . . . | 32.42 dB | −8.46 dB | 9.06 |
| 6050(MHz) | 4.68 dB | −92.11 deg | −34.23 d . . . | 34.31 deg | 22.21 deg | 38.90 dB | −8.33 dB | 8.93 |
| 6150(MHz) | 4.87 dB | −92.11 deg | −35.23 d . . . | 33.11 deg | 22.04 d . . . | 40.10 dB | −8.26 dB | 8.83 |
| 6250(MHz) | 4.90 dB | −92.11 deg | −28.26 d . . . | 30.70 d . . . | 22.20 d . . . | 33.16 dB | −8.19 dB | 8.62 |
| 6350(MHz) | 5.15 dB | −92.11 deg | −25.41 dB | 161.94 d . . . | 22.06 d . . . | 30.57 dB | −7.99 dB | 8.64 |
| 6450(MHz) | 5.02 dB | −92.11 deg | −29.76 d . . . | 160.74 d . . . | 21.75 deg | 34.78 dB | −8.16 dB | 8.86 |
| 6550(MHz) | 5.22 dB | −90.90 deg | −33.37 d . . . | −148.70 . . . | 21.19 deg | 38.58 dB | −8.17 dB | 9.41 |
| 6650(MHz) | 5.22 dB | −90.90 deg | −30.75 d . . . | −147.49 . . . | 20.76 d . . . | 35.97 dB | −8.35 dB | 9.45 |
| 6750(MHz) | 5.29 dB | −90.90 deg | −28.68 d . . . | 143.88 d . . . | 20.28 d . . . | 33.97 dB | −8.36 dB | 9.28 |
| 6850(MHz) | 5.56 dB | −90.90 deg | −35.49 d . . . | 142.68 d . . . | 19.62 deg | 41.05 dB | −8.06 dB | 9.17 |

TABLE 4

| Layer | Max value | Position | Min val . . . | Position | Beam | Max/Min | Average | Standard |
|---|---|---|---|---|---|---|---|---|
| 4950(MHz) | 6.81 dB | −90.90 deg | −20.94 d . . . | 130.64 d . . . | 27.59 d . . . | 27.75 dB | −4.84 dB | |
| 5050(MHz) | 6.81 dB | −90.90 deg | −25.73 d . . . | 130.64 d . . . | 27.31 deg | 32.54 dB | −5.33 dB | 10.30 |
| 5150(MHz) | 6.43 dB | −90.90 deg | −29.76 d . . . | −161.94 . . . | 27.62 d . . . | 36.19 dB | −5.80 dB | 10.98 |
| 5250(MHz) | 6.50 dB | 90.90 deg | −30.36 d . . . | 160.74 d . . . | 27.24 d . . . | 36.86 dB | −5.64 dB | 10.62 |
| 5350(MHz) | 6.45 dB | 92.11 deg | −27.25 d . . . | −163.14 . . . | 26.70 d . . . | 33.69 dB | −5.62 dB | 10.21 |
| 5450(MHz) | 6.75 dB | 92.11 deg | −27.81 dB | 125.82 d . . . | 25.67 d . . . | 34.56 dB | −5.51 dB | 10.31 |
| 5550(MHz) | 6.45 dB | −90.90 deg | −29.28 d . . . | 160.74 d . . . | 25.58 d . . . | 35.73 dB | −5.83 dB | 10.05 |
| 5650(MHz) | 6.77 dB | 90.90 deg | −29.32 d . . . | 159.53 d . . . | 24.64 d . . . | 36.09 dB | −5.78 dB | 9.96 |
| 5750(MHz) | 6.98 dB | 92.11 deg | −27.61 dB | 158.33 d . . . | 24.58 d . . . | 34.59 dB | −5.66 dB | 9.68 |
| 5850(MHz) | 7.07 dB | 92.11 deg | −27.47 d . . . | 153.51 d . . . | 23.95 d . . . | 34.54 dB | −5.71 dB | 9.63 |
| 5950(MHz) | 6.84 dB | −90.90 deg | −27.67 d . . . | 151.10 deg | 22.34 d . . . | 34.50 dB | −6.00 dB | 9.46 |
| 6050(MHz) | 6.97 dB | 92.11 deg | −27.54 d . . . | −154.72 . . . | 23.16 deg | 34.51 dB | −6.04 dB | 9.51 |
| 6150(MHz) | 6.96 dB | 92.11 deg | −29.29 d . . . | −155.92 . . . | 23.06 d . . . | 36.25 dB | −6.20 dB | 9.53 |
| 6250(MHz) | 6.84 dB | 92.11 deg | −29.91 dB | −155.92 . . . | 22.39 d . . . | 36.75 dB | −6.47 dB | 9.48 |
| 6350(MHZ) | 6.76 dB | 92.11 deg | −29.72 d . . . | −157.12 . . . | 22.18 deg | 36.48 dB | −6.51 dB | 9.44 |
| 6450(MHz) | 6.53 dB | 92.11 deg | −30.00 d . . . | −152.31 . . . | 21.90 deg | 36.54 dB | −6.77 dB | 9.48 |
| 6550(MHz) | 6.51 dB | 92.11 deg | −33.59 d . . . | −148.70 . . . | 21.47 deg | 40.11 dB | −6.98 dB | 9.62 |
| 6650(MHz) | 6.37 dB | 92.11 deg | −33.25 d . . . | −145.08 . . . | 21.25 deg | 39.62 dB | −7.29 dB | 9.51 |
| 6750(MHz) | 6.30 dB | 92.11 deg | −28.17 dB | −142.68 . . . | 20.68 d . . . | 34.47 dB | −7.41 dB | 9.13 |
| 6850(MHz) | 6.30 dB | 92.11 deg | −25.42 d . . . | −164.35 . . . | 20.49 d . . . | 31.72 dB | −7.21 dB | 8.79 |

Table 5 below shows specifications of a prototype, e.g., the prototype shown in the FIG. 4 photograph.

TABLE 5

| Design Parameter | Design Targets | 4.9 GHz Specs | 5 GHz Specs | 6 GHz Specs | Comment |
|---|---|---|---|---|---|
| Frequency | 4900-6900 MHz | 4940-4990 MHz | 5150-5875 MHz | 5925-6875 MHz | — |
| Nominal Input Impedance | 50 Ω | 50 Ω | 50 Ω | 50 Ω | — |
| Maximum VSWR | 1.5:1 | 1.5:1 | 1.5:1 | 2:1 | — |
| Polarization | Horizontal | Horizontal | Horizontal | Horizontal | — |
| Peak Gain | 7 dBi | 7 dBi | 7 dBi | 7 dBi | — |
| SLL 30° Above & Below the Horizon | <−15 dB | N/A | <−14 dB | <−15 dB | Constrained by the main beam's beamwidth over U-NII-1 |
| Azimuth Plane Ripple | <3 dB | ≈5 dB | ≈3.5 dB | ≈2 dB | Typical values |
| Elevation Plane Beamwidth | 15° < BMW < 30° | 28° | 25° | 22° | Typical values |

Figure 27:
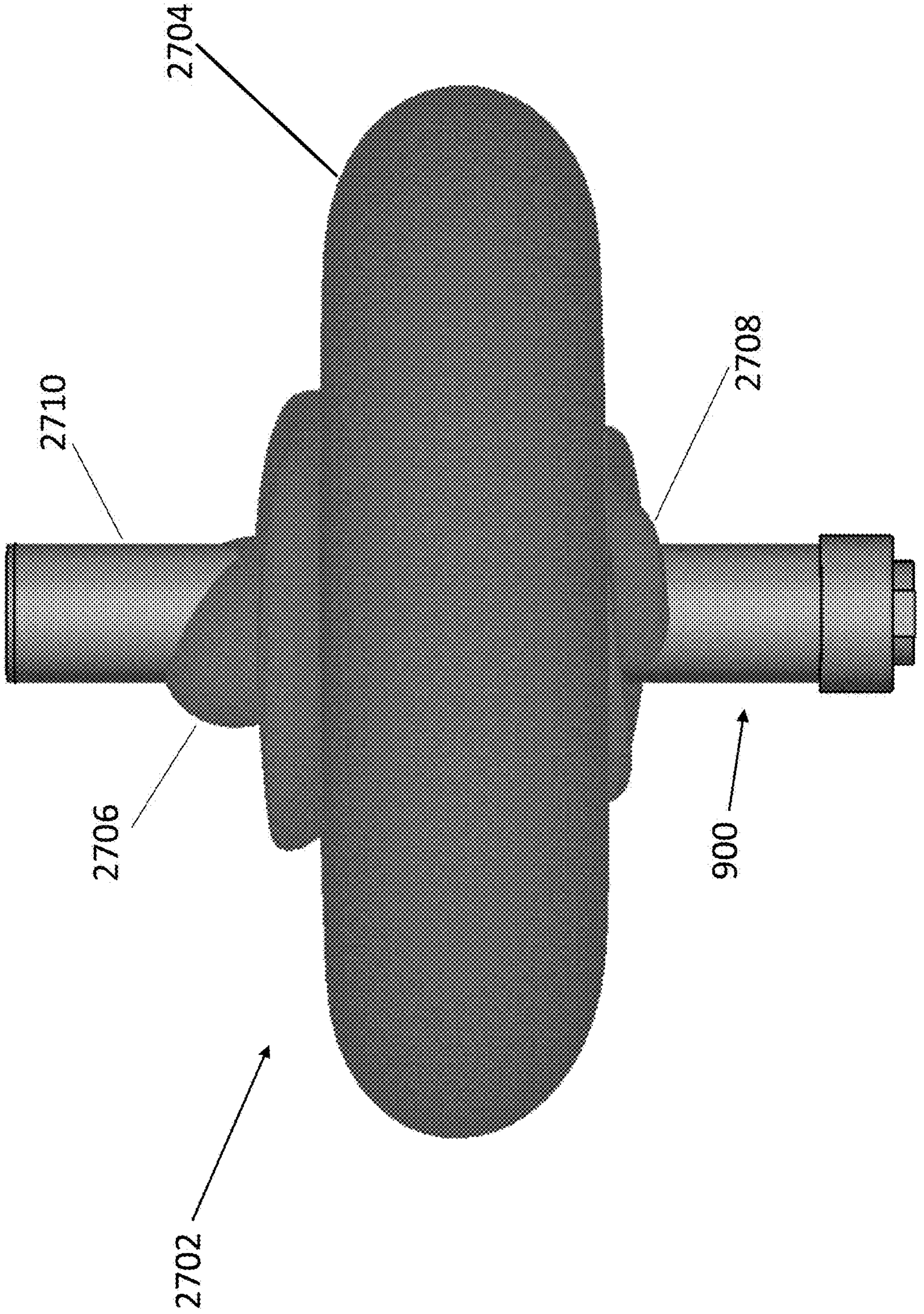
FIG. 27 is a side view of a model of a 3-dimensional radiation pattern for the simulation model of FIG. 3.
Figure 28:
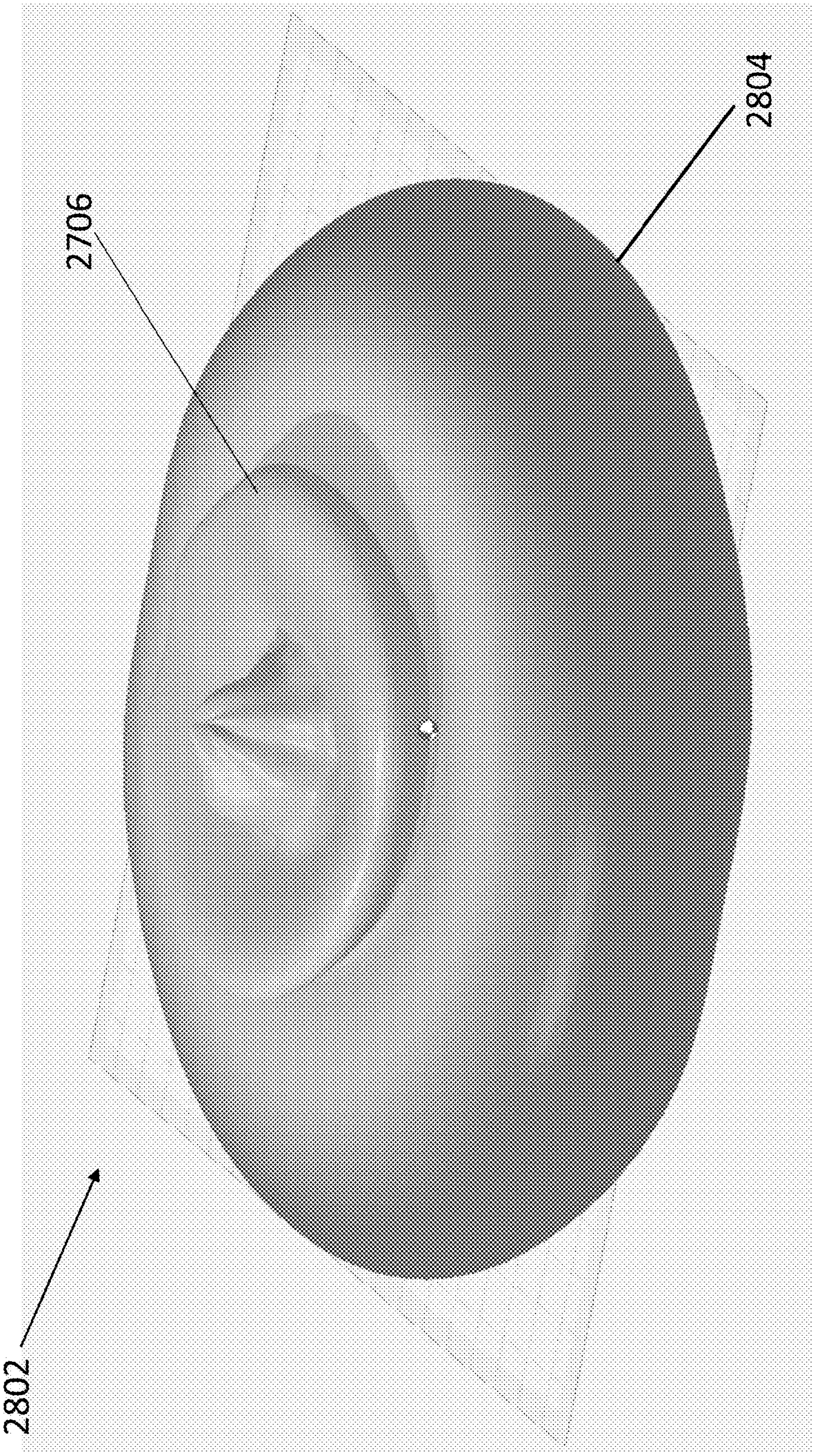
FIG. 28 is a perspective view of a graph of a measured 3-dimensional radiation pattern for a prototype.

FIG. 27 shows a side view of a model of a 3-dimensional radiation pattern 2702 for the simulation model 900 of FIG. 9. The radiation pattern 2702 shows a main lobe 2704 at a plane perpendicular to the body 2710 of the simulated antenna 900, and smaller sidelobes 2706, 2708 respectively above and below 30° from the horizontal plane, which comports with the simulation data as described above. FIG. 28 shows a perspective view of a graph of a measured 3-dimensional radiation pattern 2802 for a prototype, e.g., the prototype of FIG. 4. The radiation pattern 2802 shows a main lobe 2804 at a central horizontal plane, and a smaller sidelobe 2806 above the horizontal plane, which comports with the measured data as described above.

Specific embodiments of a horizontally-polarized omnidirectional antenna with broadband amplitude taper according to this disclosure have been described for the purpose of illustrating the manner in which the invention can be made and used. It should be understood that the implementation of other variations and modifications of subject disclosure and its different aspects will be apparent to one skilled in the art, and that subject disclosure is not limited by the specific embodiments described. Features described in one embodiment can be implemented in other embodiments. The subject disclosure is understood to encompass this disclosure and any and all modifications, variations, or equivalents that fall within the spirit and scope of the basic underlying principles disclosed and claimed herein.

What is claimed is:

1. A horizontally-polarized omnidirectional antenna, comprising:

a body comprising:

a host printed circuit board (PCB) comprising:

a plurality of host slots;

a metal-flooded ground plane;

a plurality of windows in the metal-flooded ground plane, respectively corresponding to the plurality of host slots;

an interconnect configured to convey a radio frequency (RF) signal at characteristic impedance $Z_0$; and a common port configured to receive the RF signal and split off into first and second $2*Z_0$ transmission lines to form an equal power division at a first power split, each of the first and second $2*Z_0$ transmission lines being configured to step into $Z_0^{1/2}$ at a second power split using a multi-section transformer comprising a $0.5\sqrt{(2)}*Z_{high}$ line and a first $Z_0$ line, the first $Z_0$ line dividing power at the second power split to form a $Z_{high}$ line and a second $Z_0$ line at a chamfer, the $Z_{high}$ line extending from an antenna taper location that is more than halfway down the chamfer from the second power split, the $Z_{high}$ line stepping into a third $Z_0$ line using a $2*Z_0$ transformer, where $Z_{high}$ is at least $2.25*Z_0$;

a plurality of antenna elements, each corresponding to a respective one of the plurality of host slots and a respective window corresponding to the respective host slot of the host PCB, each of the plurality of antenna elements comprising:

an antenna PCB, the antenna PCB including an antenna slot having a pullback region such that the host PCB is inserted into the antenna PCB in the antenna slot, the antenna PCB is inserted into the host PCB in the corresponding host slot, the corresponding window is in the antenna slot, and the pullback region being spaced apart from the host PCB;

a first plurality of conducting strips at an outer periphery of a top side of the antenna PCB in a loop pattern;

a second plurality of conducting strips at an outer periphery of a bottom side of the antenna PCB in a loop pattern, such that ends of each of the second plurality of conducting strips slightly overlap ends of each of the first plurality of conducting strips to form a plurality of capacitive elements at overlap regions;

a pair of input conducting strips respectively connected to an opposing pair of the first plurality of conducting strips on the top side of the antenna PCB;

a first shunt stub crossing the pair of input conducting strips on the top side of the antenna PCB;

a pair of input connection solder joints at respective ends of the pair of input conducting strips near a center of the antenna PCB on the top side of the antenna PCB, the input connection solder joints being on opposite sides of the corresponding window of the host PCB;

a first compensation strip extending from one of the first plurality of conducting strips adjacent to pullback region of the antenna slot on the top side of the antenna PCB;

a transmission feed connection solder joint connected directly between the pair of input connection solder joints across the respective window;

a pair of ground conducting strips respectively connected to an opposing pair of the second plurality of conducting strips on the bottom side of the antenna PCB;

a second shunt stub crossing the pair of input conducting strips on the bottom side of the antenna PCB;

a pair of ground connection solder joints at respective ends of the pair of ground conducting strips near a center of the antenna PCB on the bottom side of the antenna PCB, the ground connection solder joints being on opposite sides of the corresponding window of the host PCB;

a ground return connection solder joint connected directly between the pair of ground connection solder joints across the respective window; and a second compensation strip extending from one of the second plurality of conducting strips adjacent to the antenna slot opposite to the pullback region of the antenna slot on the bottom side of the antenna PCB; and an RF connector coupled to one end of the body to receive a power supply for the antenna, wherein each of the second and third $Z_0$ lines of each of the first and second $2*Z_0$ transmission lines is connected to a corresponding transmission feed connection solder joint of a corresponding antenna element.

2. The antenna of claim 1, wherein each antenna element comprises a loop antenna.

3. The antenna of claim 1, wherein:

the host PCB further comprises a plurality of openings in the metal-flooded ground plane, the plurality of openings respectively corresponding to one of the plurality of antenna elements; and each of the plurality of antenna elements further comprises:

a first pair of mechanical solder joints on the top side of the antenna PCB, the first pair of mechanical solder joints being located on opposite sides of the corresponding opening in the host PCB to mechanically fix the top side of the antenna PCB to the host PCB; and a second pair of mechanical solder joints on the bottom side of the antenna PCB, the second pair of mechanical solder joints being located on opposite sides of the corresponding opening in the host PCB to mechanically fix the bottom side of the antenna PCB to the host PCB.

4. The antenna of claim 3, wherein:

the first pair of mechanical solder joints is physically connected to each other;

the second pair of mechanical solder joints is physically connected to each other; and the first pair of mechanical solder joints is physically connected to the second pair of mechanical solder joints.

5. The antenna of claim 1, wherein each $Z_{high}$ line comprises:

an 8 mil-wide trace; and a gap-to-ground distance of 16 mils.

6. The antenna of claim 1, wherein the metal-flooded ground plane of the host PCB reflects energy radiated by each antenna element.

7. The antenna of claim 1, wherein the metal-flooded ground plane comprises copper.

8. The antenna of claim 1, wherein the antenna is configured to operate in a band of about 4.9-6.9 GHz.

* * * * *